United States Patent
Snelling et al.

(10) Patent No.: US 6,418,131 B1
(45) Date of Patent: Jul. 9, 2002

(54) SPECTRUM MONITORING FOR PSTN SUBSCRIBERS

(75) Inventors: Richard K. Snelling, Alpharetta; P. Stuckey McIntosh; John C. W. Taylor, both of Atlanta; Mark Tucker, Norcross, all of GA (US)

(73) Assignee: Lake Communications Limited (IE)

( * ) Notice: Subject to any disclaimer, the term of this patent is extended or adjusted under 35 U.S.C. 154(b) by 0 days.

(21) Appl. No.: 09/083,464

(22) Filed: May 22, 1998

Related U.S. Application Data

(63) Continuation-in-part of application No. 08/843,700, filed on Apr. 16, 1997, now Pat. No. 6,058,104, which is a continuation-in-part of application No. 08/709,597, filed on Sep. 9, 1996, now Pat. No. 5,805,582, which is a continuation of application No. 08/262,214, filed on Jun. 17, 1994, now Pat. No. 5,555,258.

(51) Int. Cl.[7] .................................................. H04J 3/16
(52) U.S. Cl. ........................ 370/337; 370/277; 370/347; 370/360; 370/466; 455/561
(58) Field of Search ................................. 370/259, 277, 370/310, 337, 338, 347, 352, 359, 360, 465, 466, 467, 535; 455/403, 422, 454, 515, 561

(56) References Cited

U.S. PATENT DOCUMENTS

| | | | |
|---|---|---|---|
| 3,949,172 A | 4/1976 | Brown et al. | 179/2.5 |
| 4,058,678 A | 11/1977 | Dunn et al. | 179/2.5 |

(List continued on next page.)

FOREIGN PATENT DOCUMENTS

| | | | |
|---|---|---|---|
| CA | 2053776 | 4/1993 | H04K/1/00 |
| EP | 0 918 423 | 5/1999 | H04L/29/06 |

(List continued on next page.)

OTHER PUBLICATIONS

International Search Report in related PCT/US00/00623.

PC Magazine "NetTools Networking Kit" Sep. 1, 1998.

(List continued on next page.)

*Primary Examiner*—Douglas Olms
*Assistant Examiner*—Shick Hom
(74) *Attorney, Agent, or Firm*—Kilpatrick Stockton LLP

(57) ABSTRACT

Systems for connecting PSTN lines to telephones, handsets, computers, telecopy machines and other end user interfaces or consumer electronics devices in a residence or business. Systems according to the present invention include Network Control Units which form the center of a star topology and which communicate via RF link with Wireless Access Units and handsets. Wireless Access Units feature an interface, such as, for example, a standard telephone jack, for accommodating a telephone, a fax machine, a compute modem or other device. Computers or other devices may also be accommodated by Wireless Access Units having other physical and virtual interfaces, including, for instance, serial ports or network interfaces. The Wireless Access Units may also be digital to accommodate ISDN for any other digital standard. Wireless control/monitoring accessories may also be employed to communicate with the Network Control Unit and provide additional functionality such as entrance monitoring, baby monitoring, HVAC control and other services. Such systems may monitor various bands of interest, process, store and change their operation according to information associated with signals or noise in such bands, and, if desired, report such information upstream to management nodes for various purposes.

39 Claims, 18 Drawing Sheets

U.S. PATENT DOCUMENTS

| | | | |
|---|---|---|---|
| 4,456,793 A | 6/1984 | Baker et al. | 179/99 R |
| 4,475,193 A | 10/1984 | Brown | 370/489 |
| 4,479,033 A | 10/1984 | Brown et al. | 179/2.51 |
| 4,514,594 A | 4/1985 | Brown et al. | 179/2.51 |
| 4,523,307 A | 6/1985 | Brown et al. | 370/281 |
| 4,658,096 A | 4/1987 | West, Jr. et al. | 379/59 |
| 4,675,863 A | 6/1987 | Paneth et al. | 370/484 |
| 4,737,975 A | 4/1988 | Shafer | 379/58 |
| 4,775,997 A | 10/1988 | West, Jr. et al. | 379/58 |
| 4,776,001 A | 10/1988 | Murata et al. | 379/62 |
| 4,779,262 A | 10/1988 | Avis et al. | 370/50 |
| 4,785,450 A | 11/1988 | Bolgiano et al. | 370/95 |
| 4,792,946 A | 12/1988 | Mayo | 370/86 |
| 4,817,089 A | 3/1989 | Paneth et al. | 370/95 |
| 4,825,448 A | 4/1989 | Critchlow et al. | 370/8 |
| 4,893,317 A | 1/1990 | Critchlow et al. | 375/97 |
| 4,912,705 A | 3/1990 | Paneth et al. | 370/95.1 |
| 4,922,517 A | 5/1990 | West, Jr. et al. | 379/58 |
| 4,994,802 A | 2/1991 | Critchlow et al. | 341/122 |
| 5,008,900 A | 4/1991 | Critchlow et al. | 378/8 |
| 5,022,024 A | 6/1991 | Paneth et al. | 370/324 |
| 5,072,308 A | 12/1991 | Lin et al. | 358/426 |
| 5,101,418 A | 3/1992 | Critchlow et al. | 375/38 |
| 5,119,375 A | 6/1992 | Paneth et al. | 370/95.1 |
| 5,121,391 A | 6/1992 | Paneth et al. | 370/95.1 |
| 5,146,473 A | 9/1992 | Critchlow et al. | 375/8 |
| 5,159,705 A | 10/1992 | Critchlow et al. | 455/76 |
| 5,168,507 A | 12/1992 | Critchlow et al. | 375/13 |
| 5,177,741 A | 1/1993 | Critchlow et al. | 370/110.4 |
| 5,212,830 A | 5/1993 | Miller | 455/33.1 |
| 5,224,120 A | 6/1993 | Schilling | 375/1 |
| 5,228,053 A | 7/1993 | Miller et al. | 375/1 |
| 5,228,056 A | 7/1993 | Schilling | 375/1 |
| 5,260,941 A | 11/1993 | Wilder et al. | 370/362 |
| 5,260,967 A | 11/1993 | Schilling | 375/1 |
| 5,263,045 A | 11/1993 | Schilling | 375/1 |
| 5,274,665 A | 12/1993 | Schilling | 375/1 |
| 5,276,703 A | 1/1994 | Budin et al. | 370/93 |
| 5,289,497 A | 2/1994 | Jacobson et al. | 375/1 |
| 5,299,226 A | 3/1994 | Schilling | 375/1 |
| 5,307,399 A | 4/1994 | Dai et al. | 379/57 |
| 5,361,294 A | 11/1994 | Lee et al. | 370/29 |
| 5,381,446 A | 1/1995 | McIntosh | 375/1 |
| 5,384,826 A | 1/1995 | Amitay | 379/59 |
| 5,416,778 A | 5/1995 | Chan et al. | 370/95.1 |
| 5,497,373 A | 3/1996 | Hulen et al. | 370/79 |
| 5,533,027 A | 7/1996 | Akerberg et al. | 370/195.1 |
| 5,555,258 A | 9/1996 | Snelling et al. | 370/29 |
| 5,610,912 A | 3/1997 | Johnston | 370/359 |
| 5,805,582 A | 9/1998 | Snelling et al. | 370/337 |
| 5,812,951 A * | 9/1998 | Ganesan et al. | 370/338 |
| 6,052,365 A | 4/2000 | Bhagalia et al. | 370/336 |
| 6,058,104 A * | 5/2000 | Snelling et al. | 370/277 |
| 6,097,733 A | 8/2000 | Basu et al. | 370/468 |

FOREIGN PATENT DOCUMENTS

| | | | | |
|---|---|---|---|---|
| JP | 01-16051 | 1/1989 | | H04M/1/00 |
| JP | 01-57860 | 3/1989 | | H04M/3/42 |
| JP | 01-309530 | 12/1989 | | H04B/7/26 |
| JP | 01-309531 | 12/1989 | | H04M/7/26 |
| JP | 02-34046 | 2/1990 | | H04B/7/26 |
| JP | 02-34047 | 2/1990 | | H04B/7/26 |
| JP | 02-63352 | 3/1990 | | H04M/1/00 |
| JP | 03-179957 | 8/1991 | | H04M/1/00 |
| JP | 05-153043 | 6/1993 | | H04B/7/26 |
| WO | WO 96/12264 | 4/1996 | | G08G/1/127 |
| WO | WO 98/10577 | 3/1998 | | H04M/11/00 |
| WO | WO 98/49850 | 11/1998 | | H04Q/7/26 |

OTHER PUBLICATIONS

Anon, "The Cordless Office," *Telecom World (U.K.)* Dec. 1991, pp. 36–37.

Bud, Andrew, "Technologies for Personal Networking in Europe," presented at International Mobile Communications 90: Blenheim Online Ltd., Pinner, Middx, U.K. Jun. 12–14, 1990, pp. 79–88.

Costello, J., "Look—No Wires", *Office Equipment News*, Nov. 1992, pp. 46–47.

Douligeris, C., "Intelligent Home Systems", *IEEE Communications Magazine*, Oct. 1993, pp. 52–61.

Duet, D.A., "An Investigation into the Economic Impact of Low–Powered, Digital Radio in the Telephone Distribution Plant ", *Globecom '89*, Nov. 27–30, 1989, pp. 38.7.1.–38.7.5.

Duet, D.A., "Portable Phone Service for an Upscale Subdivision—An Economic Assessment", *ICC '90, IEEE GA*, Apr. 16–19, 1990, pp. 206.1.1–206.1.4.

Elliott, P.W., and T.M. Kanaropoulos, "Supporting Diverse Services in a Microcellular TDMA System", *Tenth UK Teletraffic Symposium: Performance Engineering in Telecommunications Networks*, Martlescham Heath, U.K., Apr. 14–16, 1993, pp. 28/1–28/9.

Habuka, T., and H. Sekiguchi, "Standardization of Personal Handy Phone (PHP)", *NTT Review*, vol. 5, No. 5, Sep. 1993, pp. 101–105.

Kobb, B.Z., "Personal Wireless", *IEEE Spectrum*, Jun. 1993, pp. 20–25.

Madrid, J.S. Sheldon, and G. cheadle, "A New Galaxy on the Horizon: Wireless Telephony", *TE&M* Jul. 15, 1990, pp. 49–52.

Mulder, R.J., "Radio Access in Corporate Technology Networks", *2nd International conference on Private Switching Systems and Networks*. London, Jun. 23–25, 1992, pp. 110–116.

Polimene, F., "Use your Telephones as a Home Intercom System", *Radio–Electronics*, May 1991, pp. 44–48.

Shannon and Weaver, The Mathematical Theory of Communication, The University of Illinois Press: Urbana (1949), pp. 1–117*.

Spicer, J.J., G.A. Halls, and G. Crisp, "Wireless Office Data Communications using CT2 and DECT" *IEE Colloquim on 'Personal Communications, Circuits, Systems and Technology'* Digest No. 12, London, Jan. 22, 1993, pp. 9/1–9/4.

van der Hoek, H., "From cordless PABX to PCN", *Telecommunications* (International Edition), Mar. 1991, pp. 49–52.

Werbus, V., A. Veloso, and A. Villanueva, "DECT–Cordless Functionality in New Generation Alcatel PABXs", *Electrical Communication*, 2nd Quarter 1993, pp. 172–180.

* cited by examiner

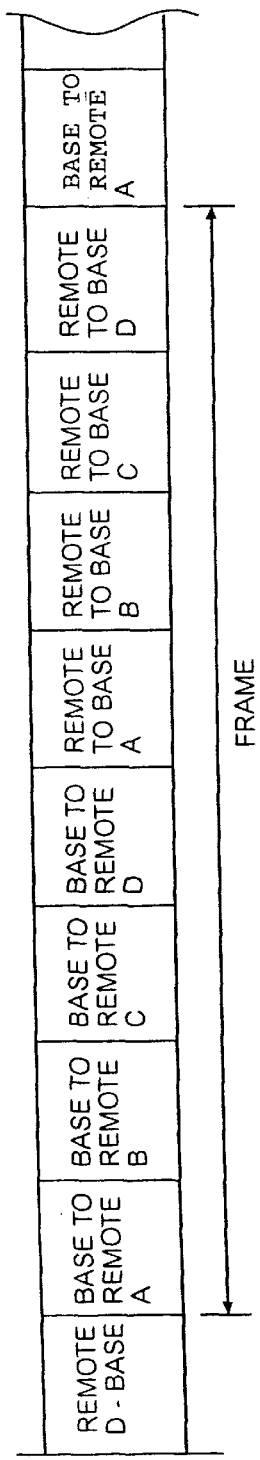
FIG.2
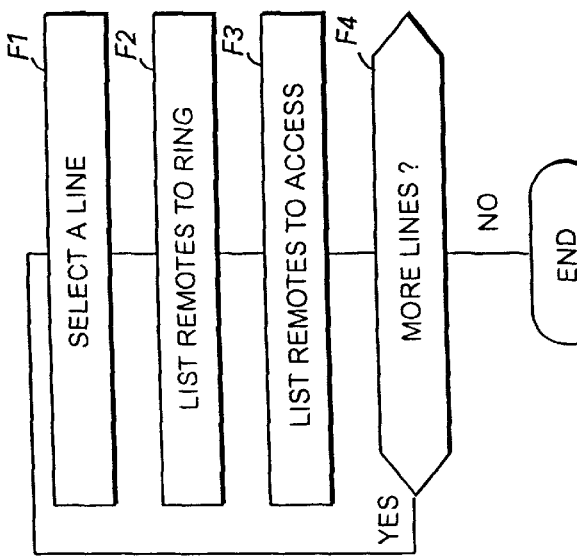
FIG.11A
| LINE | RING | ACCESS |
|---|---|---|
| 1 | 201, 203<br>301 - 304 | 201, 203<br>301 - 304 |
| 2 | 201, 203<br>301 - 304 | 201, 203<br>301 - 304 |
| 3 | 301 | 301 |
| 4 | 202 | 202 |
FIG.11B

SPECTRUM MONITORING FOR PSTN SUBSCRIBERS

FIELD OF INVENTION

This document is a continuation-in-part of U.S. Ser. No. 08/843,700 filed Apr. 16, 1997, Snelling, McIntosh, Taylor and Tucker, inventors, now U.S. Pat. No. 6,058,104, which is a continuation-in-part of U.S. Ser. No. 08/709,597 filed Sep. 9, 1996 entitled "Home Personal Communications System," having the same inventors, now U.S. Pat. No. 5,805,582, which is in turn a continuation of U.S. Ser. No. 08/262,214 filed Jun. 17, 1994, now U.S. Pat. No. 5,555,258 issued Sep. 10, 1996 having the same inventors, all of which patents are incorporated into this document as if fully set forth herein.

BACKGROUND OF INVENTION

Demand for access to voice and data communications on the public switched telephone network ("PSTN") is growing exponentially. Not only is the subscriber base expanding logarithmically, but even more significantly, individual subscribers are beginning to require more than one number and frequently multiple numbers. In addition to cellular telephones, pagers, and other mobile devices, home-based connectivity is a significant factor in this exponential growth of the PSTN. Subscribers have begun in recent times and in significant volume, to require second and third lines as a matter of course, such as for Global Information Infrastructure (so-called "Internet") connectivity and data communications and for childrens' lines.

Although it is conventional for a residence to contain standard telephone devices in various rooms supported by one line and perhaps a computer supported by another, the days of standard analog "plain old telephone service" or "POTS" are waning as demand for bandwidth to support graphics, interactive technology and the so-called "push technology" on computer devices grows. In 1995, for instance, the Regional Bell Operating Companies ("RBOC's") began transporting more data than voice communications. Accordingly, not only are subscribers employing more lines; the nature of the connection is also changing. The rate of change will only increase over time.

The increased demand for residential subscriber lines, and the ever changing nature of those lines as new standards are developed in order to accommodate new and different services, occur in the face of a major residential constriction: wiring of the residence. Standards such as ADSL aim to minimize that problem by delivering multiple channels on a single line and splitting analog and digital channels at the customer demarcation point in a manner that allows digital signals to be delivered in the vicinity of the computer. That paradigm is compromised as, inevitably, subscribers require computers and other connected electronic devices throughout the residence. These devices will not only resemble computers or televisions in nature, they may be any electronic device one wishes to access remotely. The anticipated 128 bit Internet protocol address format will, it is estimated, accommodate every lightbulb in the world.

Presently, however, most residences feature only single twisted pair wiring in the walls. Rewiring for additional lines throughout the house, whether via today's twisted pair or perhaps coax standard, is trouble and expense enough, and a great disincentive which constricts demand for increased residential bandwidth. As time passes and the rate of technology change increases, however, subscribers could find themselves needing to rewire every several years in order to accommodate changing standards and increasing bandwidth.

These factors create a need for connectivity in the residence between the PSTN customer demarcation point and telephones, computers, fax machines, and any other device which may be connected to the PSTN or feature an IP address. Such connectivity must suffice not only for today; it must alleviate the need to rewire the residence in order to accommodate new changes, it must accommodate new devices, formats, protocols and standards, whether analog or digital, and it must be flexible and modular in design in order to accommodate a wide-ranging set of needs and preferences among the subscriber base.

On another score, spectrum for cordless telephony devices is being saturated at a logarithmic rate; as time progresses it will be useful for cordless telephony devices and other mobile telephony devices to monitor usage of radiofrequency bands on which they operate and to adjust their operation accordingly, whether in time, frequency or both. It will also be useful for such devices to report spectrum use and occupation information upstream, as well as to report information about their status and use.

SUMMARY OF THE INVENTION

Systems according to the present invention feature a Network Control Unit or Web Control Unit ("NCU") which interfaces to any desired number of PSTN lines. Where the lines are analog, a Network Interface in the NCU digitizes the signals and otherwise renders them compatible for delivery to a cross-connect switch/conference bridge/accessory block ("CAB") module which may be programmed in the residence or remotely to connect signals from each line to any predetermined combination of telephony, computer, or other electronic devices in the residence. The CAB is coupled to a radio multiplex engine which multiplexes the signals for bandwidth efficiency and other purposes, and delivers them to an NCU Radio Transceiver for delivery via RF link, which may also be multiplexed if desired, throughout the residence.

At the other end of the RF link, the system features handsets and/or Wireless Access Units or "wireless jacks." The handsets include a transceiver, multiplex/demultiplex circuits, analog/digital conversion circuits such as so-called "codec's" and control circuitry with a combination of, for instance, microphone and earphone for voice communications, and perhaps a jack for data communications. The Wireless Access Unit contains circuitry similar to the handset in analog environments, plus additional circuitry for delivery of the signal to a standard interface such as an RJ-11 jack. Such Wireless Access Units can be made available, according to the present invention, to accommodate any physical and electrical interface standard, such as Wireless Access Units for ISDN interfaces and any other desired digital services.

Accordingly, the PSTN lines may terminate in the residence at a Network Control Unit which may be physically small and innocuous in appearance, perhaps mounted on a wall and, if desired, coupled to a nearby electrical outlet and to a personal computer or other interface if the user desires control other than by interfaces on the Network Control Unit itself. The unit may feature a stub antenna or other desired antenna. Throughout the residence, any device desired to connect to the PSTN can contain its own Wireless Access Unit which may be battery powered and connect to the NCU via RF link.

The present invention accordingly makes possible wireless, efficient, flexible and modular connectivity between any desired device and the PSTN within the residence. The Network Control Unit itself may be modular in design to accommodate various circuit boards for various changing and evolving standards and protocols. New Wireless Access Units may be purchased for whatever particular devices a particular subscriber desires, and he or she may update the system with new circuit boards and new Wireless Access Units and perhaps new handsets as time passes, new devices and services evolve, and standards change.

The present invention also includes apparatus and systems which are adapted to monitor radiofrequency bands on which they operate, as well as other bands, in order to adjust their operation if expedient or necessary. Such systems may include a node in the telecommunications to which base units or network control units can report information including occupation of spectrum by other base units or network control units, or any other emitters, as well as information about status or use of base units or any wireless access units or handsets, or other devices, associated with such base units. Bands may be scanned or monitored in gross. RF signal sources such as other base units, other wireless devices, and other sources of signals or noise on relevant spectrum can be monitored. Additionally, devices according to the present invention can monitor and report their own status, such as battery condition; base units can also monitor and collect information about wireless device use and signal strength, among other data. Such information at the node can be useful for purposes such as help desk functionality, design modifications, and adjustment of operation (to the extent, if any, not done at the base unit or wireless device level) of apparatus according to the present invention.

It is accordingly an object of the present invention to provide a flexible, modular, system which provides connectivity between the PSTN and any desired electronic devices a subscriber wishes to connect, via RF link.

It is an additional object of the present invention to provide business and residential wireless connectivity between the PSTN and computers, handsets, and other devices which eliminates the need to rewire businesses and residences in order to accommodate new standards and services.

It is an additional object of the present invention to provide RF based connectivity between any number of PSTN lines and any number of now existing or future electronic devices, in a modular and flexible manner.

It is an additional object of the present invention to provide cordless telephony devices which can monitor and collect information about spectrum use and their own status, and if desired, make use of such information to adjust their operation, or report some or all of such information upstream to other points in the telecommunications network.

Other objects, features and advantages of the present invention will become apparent with respect to the remainder of this document.

BRIEF DESCRIPTION OF THE DRAWINGS

FIG. 2 is a schematic, greatly simplified, representation of a Time Division Multiplex Access ("TDMA") frame having eight slots supporting four bi-directional channels in accordance with one embodiment of the present invention.

FIG. 11A is a simplified flow diagram illustrating one configuration sequence of the Network Control Unit of FIG. 3.

FIG. 11B is a table showing configuration of the Network Control Unit of FIG. 3 resulting from the configuration sequence shown in FIG. 11A.

DETAILED DESCRIPTION OF THE DRAWINGS

Figure 1:
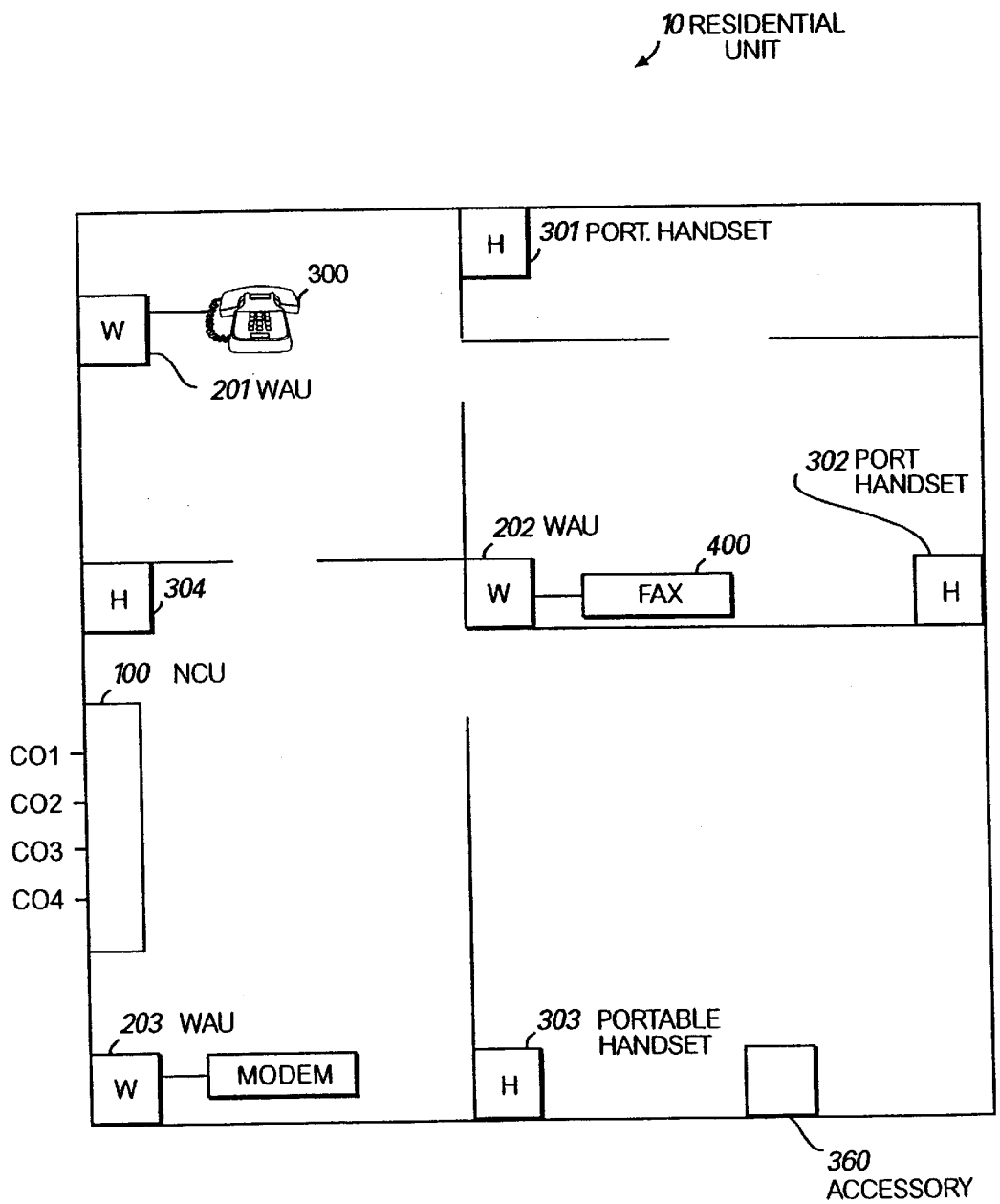
FIG. 1 is a schematic view of a residence which features one embodiment of a system according to the present invention.

FIG. 1 is a schematic hypothetical floor plan for a residence or business containing a communications web according to the present invention. The floor plan shows a Network Control Unit or "NCU" 100 which terminates four central office POTS lines designated "C01" through "C04." A number of Wireless Access Units or wireless jacks ("WAU's") 201–203 may be found throughout the floor plan, linked via RF link to the NCU. Additionally, a number of handsets and conventional telephones 300–304 whether portable or connected to a WAU may also be found throughout the floor plan. Other electronic devices such as a fax 400 may be included; fax 400 in FIG. 1 is shown connected to a WAU 202.

Any number of PSTN lines or connections may terminate in one or more NCUs for a particular location according to the present invention. The PSTN lines may be analog or digital, and may incorporate any desired present or future analog or digital standard, format or protocol. Similarly, WAUs according to the present invention, which may be RF linked to one or more NCUs for a particular location, can be adapted to accommodate any telecommunication, consumer electronic or other required standard, format or protocol, whether analog or digital and can be manufactured and sold individually for that purpose to render communications webs according to the present invention modular in nature with a mix of components to suit every reasonable taste and preference. A WAU may connect to, for instance, a "telephone", such as telephone instrument 300 in FIG. 1, a conventional modem, directly to a personal computer via ISDN WAU, to a fax machine via fax WAU, or any other desired electronic device. A number of WAUs and handsets may be employed according to the present invention to accommodate any particular combination of electronic devices the subscriber desires to have connected to the PSTN. FIG. 1 is purely a simple hypothetical floor plan in order to provide a modicum of perspective relative to NCUs, WAUs, handsets and other electronic devices as employed in communications webs of the present invention.

NETWORK CONTROL UNIT

Figure 3A:
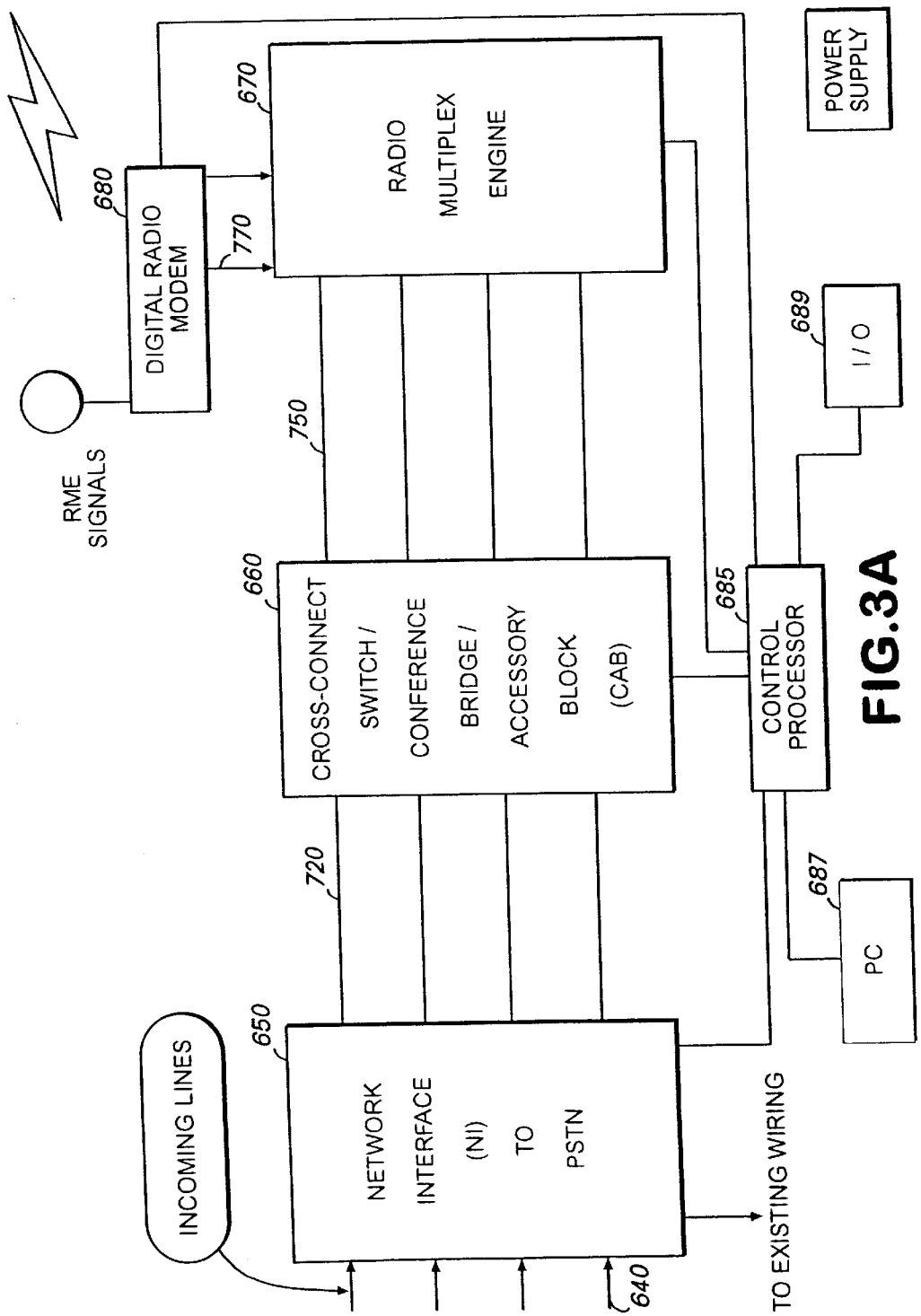
FIG. 3A is a high level functional block diagram of a Network Control Unit according to one embodiment of the present invention.
Figure 3B:
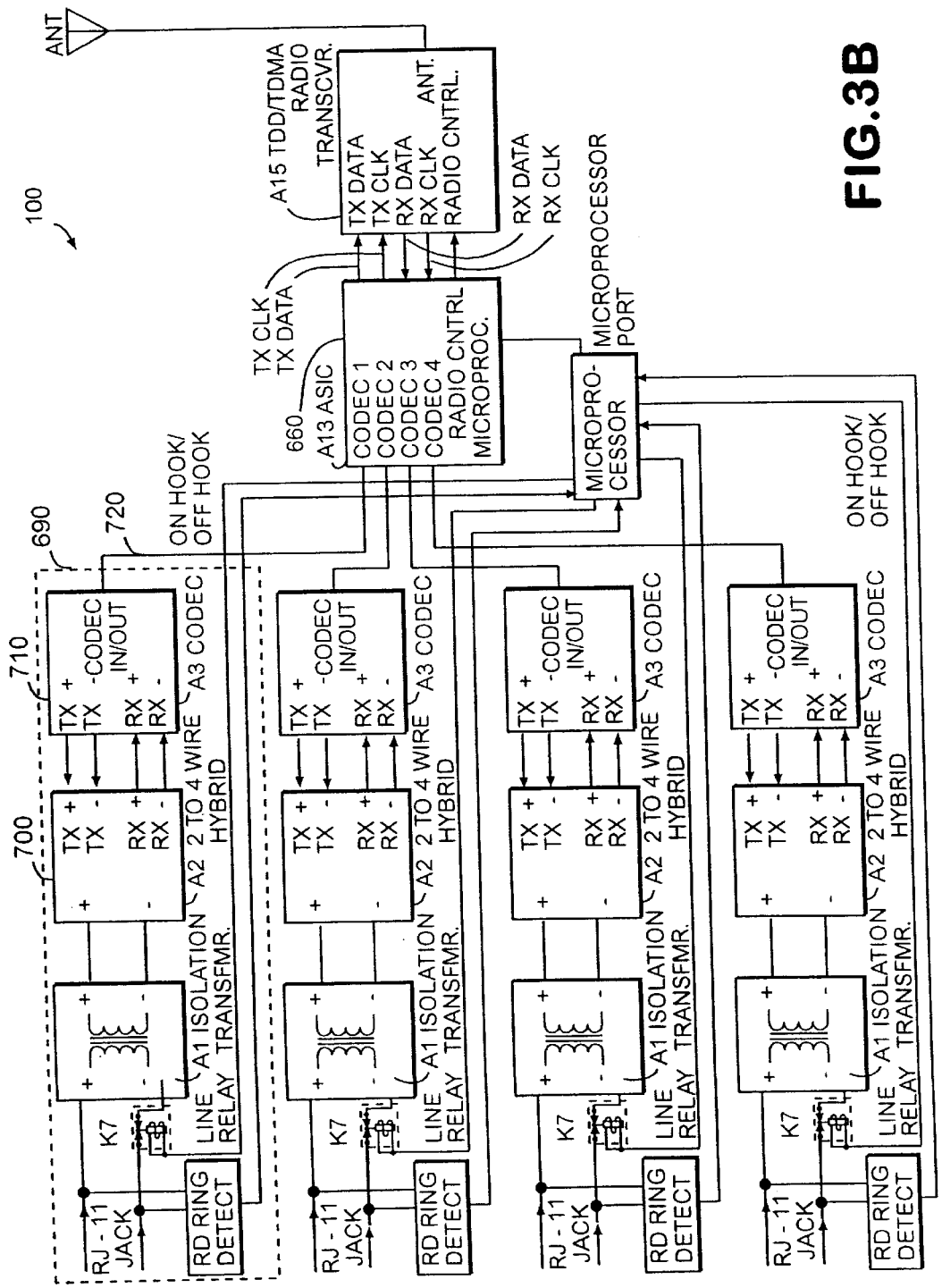
FIG. 3B is a schematic diagram, at a lower level than FIG. 3A, of a Network Control Unit according to one embodiment of the present invention in which four coder/decoder or "codec's" are employed in connection with four analog POTS lines.
Figure 3C:
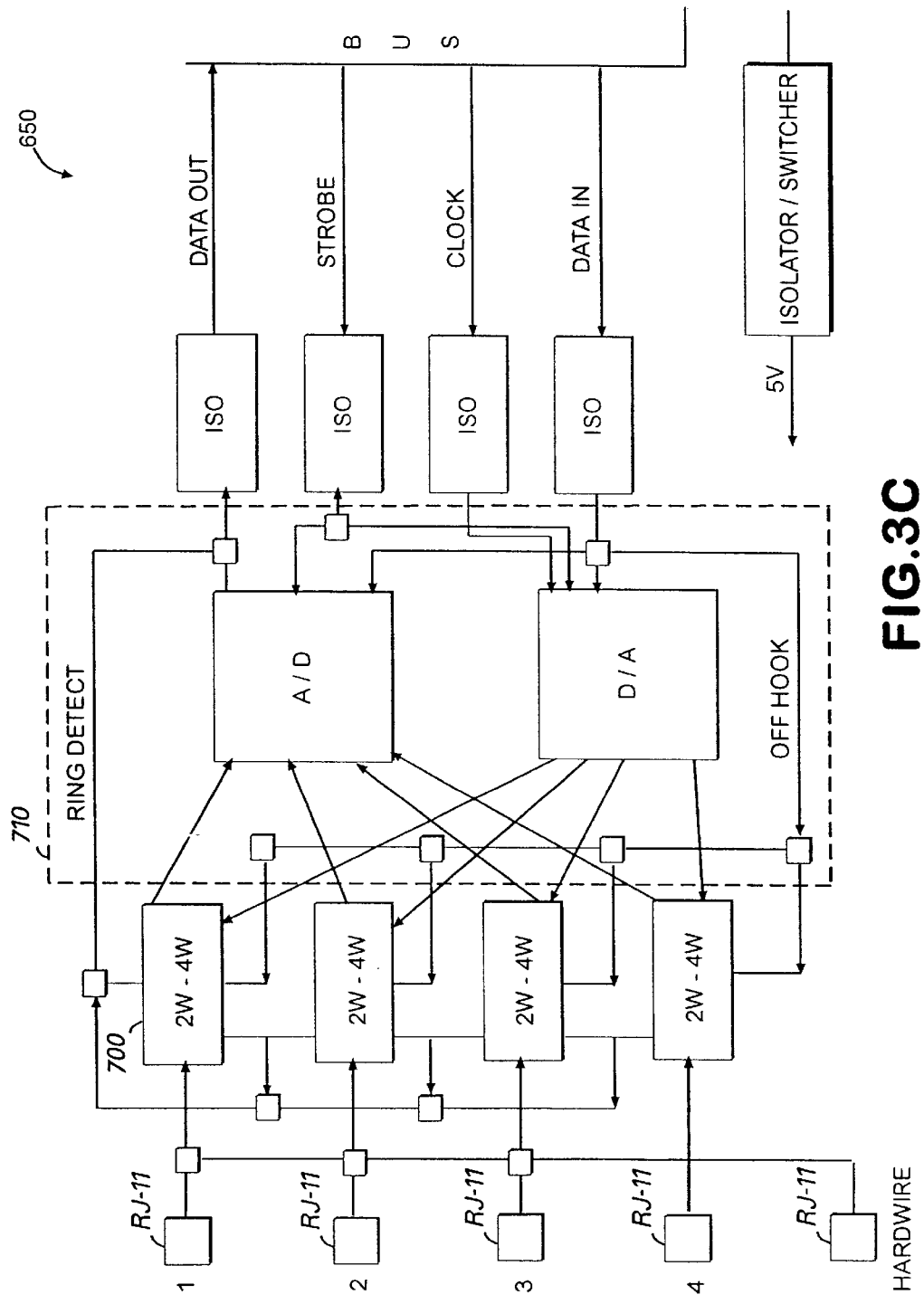
FIG. 3C is a functional block diagram of a single codec which may accommodate the four lines, for instance, shown in FIG. 3B as an alternative design for purely analog POTS lines.

FIGS. 3A through 3C show, in functional block diagram format, embodiments and portions of embodiments of Network Control Units ("NCU's") according to the present invention. According to a preferred embodiment of the present invention, NCU 100 includes interface circuitry for interfacing with PSTN lines or connections from a switch or other component of the PSTN, whether analog or digital. This circuitry, denominated "Network Interface" 650 as shown in FIG. A, couples to switching, bridging and accessory circuitry as shown with numeral 660 in FIG. 3A. This discussion considers signals in a "downstream" or a PSTN to NCU to WAU direction, from which corresponding signal flow in the opposite direction is apparent.

The Cross Connect Switch/Conference Bridge/Accessory Block ("CAB") components couple signals from the Network Interface corresponding to incoming lines, in a predetermined and programmable manner, with additional functionality, if desired, to downstream circuitry for eventual RF transmission to WAU's and handsets. The switching and bridging components of the CAB are the portion of the Network Control Unit that allow the subscriber either remotely or locally to designate by programming into the NCU which of his or her telephone instruments, computers, fax machines, and other devices connect to various PSTN lines at particular times of day or under particular conditions.

The signals being properly switched and routed in the CAB as designated for the subscriber's devices are then delivered to the NCU's "Radio Multiplex Engine" as shown in FIG. 3A with numeral 670. The RME multiplexes the signals as, for instance, by time division multiplex access, or according to any desired format, onto a number of predetermined channels for bandwidth and RF frequency conservation. The multiplexed signals are delivered to Radio Transceiver 680 where the signals may be conditioned, again multiplexed according to any desired format, and modulated onto an appropriate RF carrier or carriers in a programmable manner or as otherwise desired for transmission to WAUs 200, handsets 300 and other devices if desired.

An NCU Controller 690 connects to all circuits in the NCU and may be programmed via user interface on the NCU, via computer coupled to the Controller or other portions of the NCU, or remotely over one of the incoming lines 640.

In greater detail, the Network Interface 650 of the NCU may be modular in design and contains the circuits that connect to the public switched telephone network for accommodating various media, including twisted pair, coax, fiber and wireless, and various modes, including analog, digital or a hybrid. A Network Interface may be modular and portions for all lines may be implemented in applications specific integrated circuitry ("ASIC") medium to accommodate analog circuits, or services requiring, among other interfaces, ISDN, T-1, CATV/COAX, ATM, micro-ATM, AMPS, N-AMPS, TDMA digital cellular, CDMA digital cellular, analog or digital SMR (Nextel), PCS, LEO satellite, geosychronous satellite, Internet protocol or any other present or future form of wireless or wireline local loop or other PSTN service. As shown in FIG. 3B, the Network Interface for a system according to the present invention which accommodates four POTS lines, could take the form of a quad arrangement of independent Direct Access Arrangement ("DAA") circuits 690, each having appropriate transformer, isolator and line protection circuitry as required, a two to four wire hybrid 700, and a coder/decoder ("codec") 10. The Network Interface circuitry is accordingly adapted for appropriate isolation, impedance matching, line protection, medium conversion (two wire to four wire) and analog-to-digital/digital-to-analog conversion in order for its output signal 720 to be coupled to CAB 660. (The functionality in POTS versions of direct access arrangement circuits 690 comprises conventional components and is conventionally implemented.)

FIG. 3C shows an alternative arrangement for a Network Interface adapted to accommodate four POTS lines. There, the line conditioning circuitry which can include hybrids 700 and other components cross-couples to a single codec 710, instead of the requirement that a codec be employed for each line 640. Output of the Network Interface may be on a bus 730 instead of individual outputs coupled to CAB 660, in order to couple Network Interface 650 to CAB 660 via a multiplexed connection for physical simplicity and logical implementation. For ISDN, the Network Interface may be the so-called "U-Interface" and associated 4 level dibit modem circuitry. Other digital services require a Network Interface especially adapted to interface to a particular medium, format and protocol.

For any of the wireless local loop or so called fixed wireless services including satellite, the Network Interface may be a wireless modem which includes a radio receiver or transceivers and appropriate modulation/demodulation, coding and decoding circuitry. When the Network Interface is a wireless modem/Radio Transceiver, the NCU 100 operates as a radio transponder or rebroadcast unit, communicating with the PSTN via one wireless protocol, and with the WAUs 200, handsets 300 and other components of systems according to the present invention via the same or perhaps different protocols. This aspect of the invention may be counter-intuitive: If the connection to the PSTN is wireless, one approach is simply to connect directly to any location in the residence instead of relaying signals through the NCU 100. However, systems according to the present invention address a problem this approach would present, because Radio Transceivers that interface to the PSTN typically must comply with elaborate air interface standards having precise frequency control, well-defined RF bandwidth, higher transmit power (to accommodate the greater distance to a cell tower or PCS antenna), better receiver sensitivity, higher battery drain and shorter battery life, and increase complexity and expense. A handset 300 or a WAU 200 according to the present invention, however, is a far simpler and less expensive device which need only accommodate the present invention's less stringent internal air interface standards, but nevertheless retain the functionality to provide corded quality and reliability for indoor/nearby outdoor service that is inexpensive, compact, lightweight, flexible and manufactured and sold, if desired, tailored to specific devices such as faxes or various digital standards which not every subscriber may wish to employ.

Incoming connections to the Network Interface 650 could be physically separate twisted pairs as in the case of analog POTS lines where each line terminates from the PSTN via an independent twisted pair; alternatively, each incoming circuit can be multiplexed over a single pair, such as two digital circuits provided by a conventional, basic rate (2B+D) ISDN line. A 6 megabit per second micro-ATM fiber connection could provide digital voice service, MPEG video and other services over a single optical fiber which could be de-multiplexed (multiplexed for outgoing or upstream information) in the Network Interface, and incoming lines could be virtual. That is, additional lines could be assigned on an as needed basis and charged accordingly. For example, a subscriber might have connection to one line from 10:00 p.m. to 7:00 a.m, two lines from 7:00 a.m. to 9:00 a.m. and four lines from 9:00 a.m. to 7:00 p.m. and be billed accordingly for the partial use. As discussed below, the CAB 660 can be programmed to accommodate changes in the PSTN connections in real time in order to distribute bandwidth and service as desired among various WAUs 200, handsets 300 and the other end user interface devices.

Cross Connect Switch/Conference Bridge/Accessory Block

Cross connect switch/conference bridge/accessory blocks ("CAB's") according to the present invention may be, electronically or virtually, an n×m switch which is programmed to interconnect any incoming signal 720 from the Network Interface 650, (whether physical, virtual, multiplexed or wireless) to a number of output signals or interfaces which correspond to communications channels, according to one topology, or to combinations of the handsets, telephones, fax machines, computers or other devices serviced by WAU's 200 and/or handsets 300 of the present invention, according to another topology. The CAB 660 can, but need not, include functionality simply to bridge or conference these same circuits and/or remote devices, thus eliminating the need for further processing of the signals beyond CAB 660. A CAB may additionally contain a variety of decoders, generators, synthesizers and other circuits as desired.

CAB 660 is preferably coupled to a local Control Processor and/or an external computer and/or network or server, if desired. The external connection may be directly by bus or synchronous connection, or via any of the PSTN lines 640. In systems according to the present invention having multiple NCUs, CABs 660, Control Processors 690 and other components may be coupled and/or networked among various NCUs and/or external/or server control capacity.

The CAB shown in FIG. 3A is under control of a local Control Processor 685 and personal computer 687. For voice services, the CAB 660 may function similar to a central switchboard and conference bridge routing each line to one or more Wireless Access Units 200 and/or handsets 300 as programmed in Control Processors 685 and/or PC 687. Multiple lines 640, handsets 300, telephones connected to WAUs 200, and other devices may be conferenced to form any number of permutations and combinations of conferences. One wireless handset can call another without using any of external lines 640 simply using the allotted time slots, codes or RF channels involving the two handsets 300, or telephones connected to a WAU 200. A conference call of any two or more internal handset or telephone devices can similarly occur. Calls or conferences among multiple devices on multiple networked or shared NCU's can similarly occur.

The CAB 660, like other components in the NCU, the WAU's and the handsets, can be implemented in analog circuits including relays, transistors, CMOS media or any other application specific or nonspecific analog components and/or integrated circuits, but preferably signals 720 arriving at CAB 660 are digital so that CAB 660 may be implemented entirely digitally.

CABs 660, according to the present invention, are adapted to route and direct data signals, such as, for example, when using external data services via Internet or internal networks within the subscriber's location. In the voice case, virtual circuits may be established for each call which can remain in place for the duration of a call. In the data case, a Carrier Since Multiple Access ("CSMA") or packet switching protocol can be employed, among other formats or protocols, in order to support a larger number of bursty devices. A combination of virtual data circuits and CSMA can be employed if desired. In similar fashion, CABs 660, according to the present invention, are also adapted to accommodate voice and data traffic simultaneously, routing traffic and managing resources as desired.

Conference Bridge functionality in the CAB 660 is preferably implemented as a high quality digital bridge which maintains all connections at suitable and equal audio levels. Although the Conference Bridge functionality can be implemented in analog circuits, again it is preferably implemented digitally using logic or digital signal processing. Digital leveling and noise control may be used to maintain voice circuit quality regardless of the numbers of parties bridged together. The Conference Bridge may also be adapted to bridge in one or more outside lines onto an existing circuit, adding handsets 300 and/or WAUs 200 to the circuit.

The Accessory Block functionality, which may, but need not, form a portion of CABs 660 according to the present invention, may contain features which add flexibility and additional levels of services to communications webs according to the present invention. The Accessory Block functionality may include, for instance, DTMF generator, DTMF decoder, speech synthesizer, speech recognizer, caller ID decoder, low or high speed telephone modem, fax modem capable of group III or similar functions, real time clock/calendar and other functionality as desired. These functions are provided in conjunction with the Control Processor 685 and other portions of CAB 660 to implement capability such as autodialing, remote programmability, voice command features, digital voice prompting, and other advanced functionality. Portions or all of the Accessory Block Functionality may be sited on board or remote to NCU 100 as desired for particular implementations.

The NCU Switching, Bridging and Accessory Block functionality or any other software employed by NCU 100 may reside on board the NCU and may but not be remotely programmable or upgradeable. It may also incorporate remotely accessed or pushed program and or data objects and/or applications as desired, including in the JAVA, Active/X, or other languages.

NCU's 100 according to the present invention preferably include a standard connector such as an RJ-11 connector which may be hardwired to a single line telephone or connected, for example, to existing in-home wiring. This connector permits the NCU 100 to manage the existing telephone or wiring as part of its network, perhaps permitting them to answer any ringing line. Alternatively, a POTS NCU 100 could have a drop out relay or FET circuit which may automatically switch the existing wiring over to this connector in the event of a power failure or a system failure. If the NCU 100 is equipped with backup batteries or other auxiliary power, it may continue to function either until mains power is restored or its batteries become exhausted in which case it drops off-line and switches to the emergency bypass routing to the external connector.

Control Processor 685 according to the present invention commands switching, routing, RF, accessory and other functionality implemented in CAB 660, Radio Transceiver 680 and other circuits in NCU 100s according to the present invention. Control Processor 685 could be a small microcontroller set, although more processing power may be required to accommodate ISDN and other digital interface NCUs 100. Then, external PCS 687 and, if desired, servers, may participate in the control functions. A very simple algorithm by which the Control Processor 685 governs CAB 660 for the topology shown in FIG. 1 is shown in FIGS. 11A and 11B, in which, step-by-step, lines 640 are matched in the CAB 660 to various WAUs 200, handsets 300, and other devices. The control algorithms and programming itself may occur locally as by an interface 689 which may be implemented in buttons or a keyboard, by PC 687 or external connection, including network or PSTN.

Alternatively, systems of the present invention are adapted to permit control of the NCU 100, including Control Processor 685 and CAB 660 from a remote service center so that a subscriber can call the service center in the event the subscriber feels technically short of the task of programming his or her NCU to accommodate various WAUs 200 and handsets 300.

PC and other external connectivity leverages on higher intelligence of the PC, additional mass memory functionality for updates and databases and similar applications, the more convenient user interface, and more elaborate applications software such as, for instance, directory management, spreadsheets and database managers.

Radio Multiples Engine

CAB output signals 750 are coupled to a radio multiplex engine 670 according to the present invention which can comprise a digital logic block that implements any of the following functionality: multiplexing/demultiplexing, preferably but not necessarily TDMA/TDD (Time Division Multiplex Access/Time Division Duplex), forward error control and general error management, speech compression if required, code division multiplex and demultiplexing, if any, hopset generation if any, and other critical timing, synchronization and coding functions critical to the operation of the systems according to the present invention.

RME's 670 according to the present invention generally but not necessarily operate at speeds sufficiently high to render Control Processor 685 management ineffective, although that need not be the case.

RME signals 770 are coupled, in systems of the present invention, to wireless Radio Transceiver ("RT") circuitry 680 as shown in FIG. 3A. The RT 680 may be a low cost multiplexed Radio Transceiver or set of transceivers which provides proper modulation onto RF carriers as desired with or without multiplexing and duplexing according to any of the following formats or others: TDMA/TDD, TDMA/FDD, CDMA/FDD, CDMA/TDD, FHMA/TDD, or FHMA/FDD. The primary function is to achieve transmission of multiple simultaneous independent data streams to WAUs 200 and handsets 300.

Conveniently, the RT circuitry 680 need not conform to any error interface standard, since it communicates only with like equipment and usually does not interface to the PSTN or any other public network except via a separate, higher quality transceiver if any is implemented in the Network Interface 650 or connected to it.

Via an independent communications protocol, the RT unit 680 can communicate with other NCUs 100 that fall within radio range. The NCUs 100 can share hopset data interference records, timing and usage information, all toward the end of avoiding one another's transmissions. In like manner, the components of each system, NCUs 100, WAUs 200, handsets 300 all transmit at the lowest power possible to provide reliable communications, using power management sensing and response to the circuits. In this manner, each system minimizes its "radius of interference," the approximate circular area surrounding a given system within which it is capable of generating interference in other systems operating in the same band.

Spectrum Monitoring

When not in use, or in unused time slots of normal operation, the NCU 100 and/or the peripheral or wireless units or devices can activate themselves and monitor frequencies which may be the same as or other than the principal one which is currently in use. Whether or not they do so on a continual basis, a data log of spectral occupancy may be created and stored in a virtual table. For instance, a histogram of usage statistics on an hourly basis for each available channel can be used.

Figure 3D:
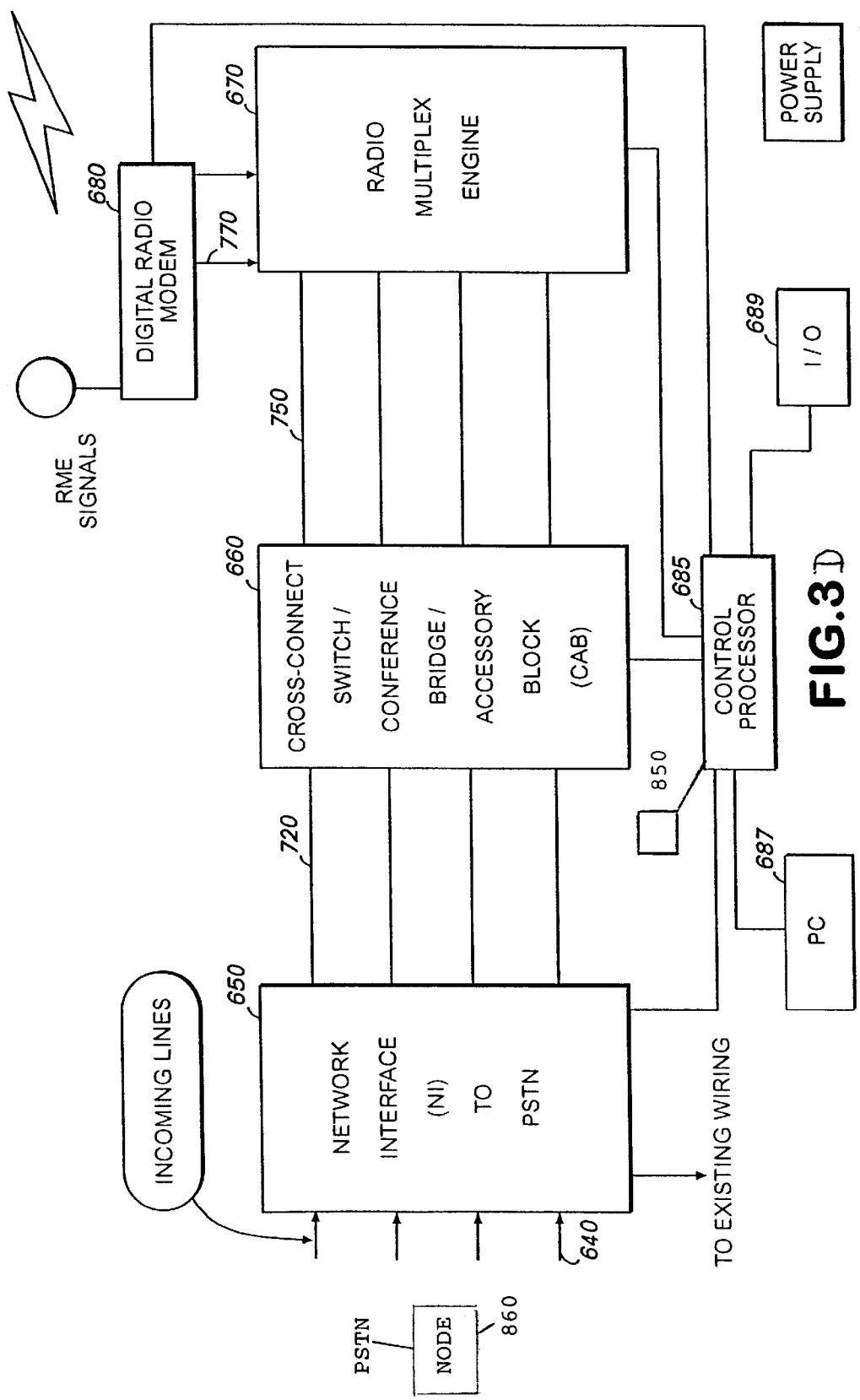
FIG. 3D is a high level functional block diagram of a Network Control Unit according to one embodiment of the present invention which is adapted to monitor, collect and report information about spectrum usage and status of wireless devices.
Figure 4:
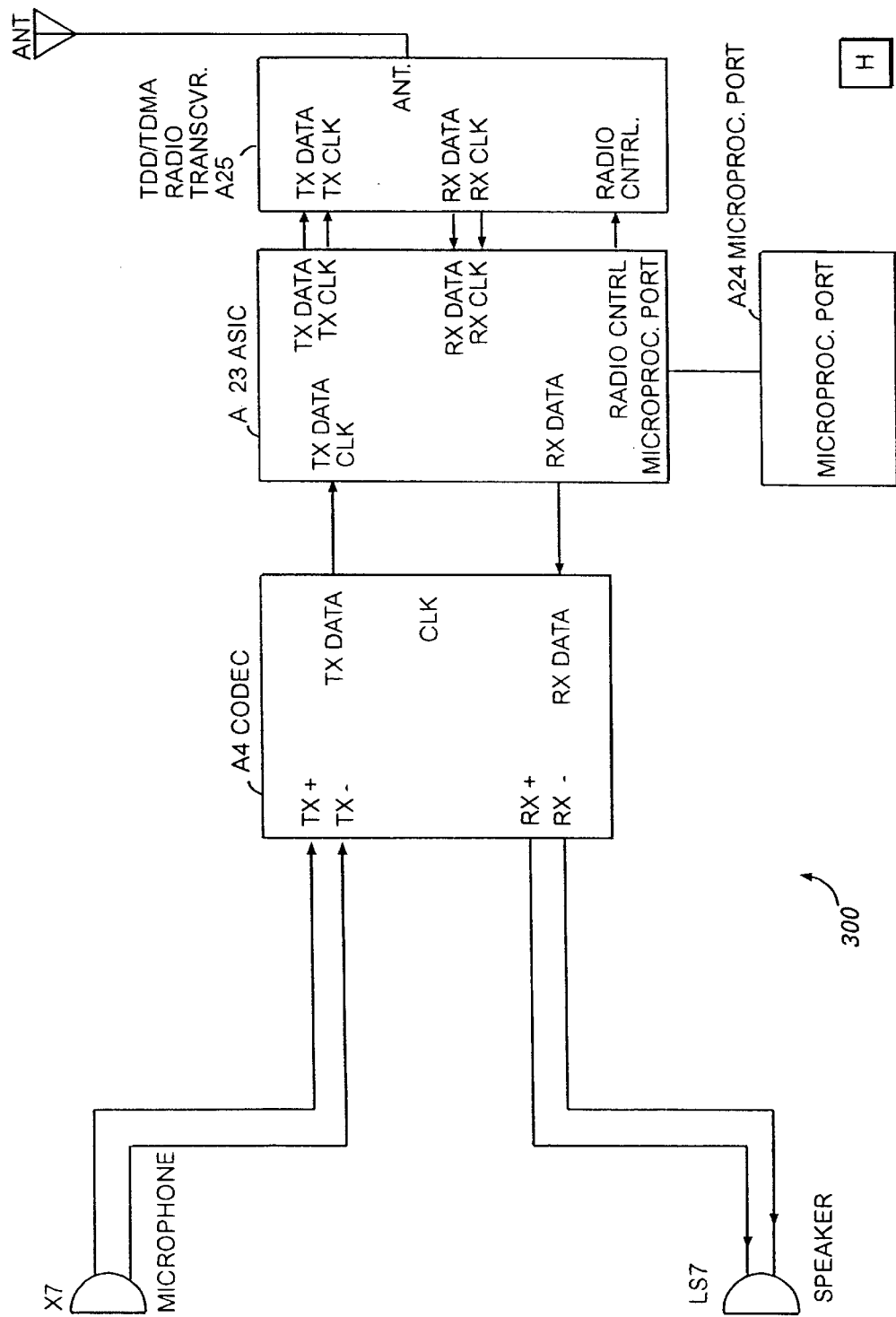
FIG. 4 is a functional block diagram of one embodiment of a handset according to the present invention.

An NCU capable of spectrum monitoring according to the present invention is shown in FIG. 3D. As shown there, processor circuitry 685 or any other desired control circuitry controls operation of the receiver portion of the Radio Multiplex Engine 670. Signals from the RME 670 may be processed in processing circuitry 685 (or any other processing capacity) and information relating to bands of interests and signals and noise therein may be collected and/or stored in storage 850 or any other desired storage capacity of whatever medium desired. Such information may be reported to the management node 860 via Network Interface 650 or as otherwise desired. Spectrum monitoring according to the present invention can be implemented and employed not only in systems with such NCU's, however; it may also be implemented in and occur in conventional cordless telephones and other wireless devices.

Due to the relatively wide IF bandwidth of multiplexed digital systems such as this, typically several megahertz of bandwidth, it may seem difficult for the system readily to discern the exact frequency and bandwidth of another signal, which may be much narrower. However, devices according to the present invention can quite readily discern both frequency and bandwidth by sweeping the receiver's local oscillator (frequency synthesizer) in frequency steps much smaller than the receiver bandwidth. For instance, an unmodulated carrier could be discerned by sweeping the receiver in small increments and averaging the frequencies where equal power is measured in the receiver. Likewise, scanning could be performed using one up sweep and one down sweep, noting frequencies and associated received signal strengths. Scanning is not necessary, however, and bands of interest could be monitored in gross.

If another NCU 100 or wireless device associated with it were on the air within receiver range, its signal can be demodulated, and an annotation can appear in the virtual table of this frequency and location. The system may also sweep or otherwise monitor spectrum beyond the outer band edges so as to gain an accurate measurement of signal characteristics for signals close to operating band edges or for other purposes.

Information corresponding to signals and noise in the monitored bands can be used to adjust operation of apparatus according to the present invention (by adjusting timing, frequency or other operation), and/or if desired may be sent upstream to a node on the telecommunications network such as, for instance, a management node 860, to provide detailed reports of the availability and spectral occupancy within the bands of interest for the purpose of monitoring local bandwidth congestion, and the general utilization of the system with respect to voice and data services. A large number of these localized, spot measurements collected at various peak and off-peak telephone usage hours, amassed and integrated in one database, can collectively form the most current, accurate national bandwidth survey conceivable.

Currently, the average voice telephone call is estimated to last between three or four minutes while the average internet session tends to last 22. A usage archive according to the present invention could document actual usage and allow observation of trends in order, for example, to predict changes in PSTN subscribers needs, which in turn would allow adaptation of products and systems more rapidly to address changing needs and avoid premature obsolescence.

Should an NCU 100 detect another NCU 100 or associated WAU, handset or other wireless device operating within range of it, information can be collected and acted upon including, for instance, the type of peripheral unit in operation, such as a wireless handset, a DB-9 wireless jack, or an RJ-11 wireless jack, times of operation, signal strength, and operating frequencies. Other signals may also be included as part of such information. This information can serve to tailor operation of either or both NCU's and associated devices to the subscribers' individual needs by among other things adjusting operation to avoiding the frequencies or times optimally favored by other systems, for purposes of increasing the system's reliability and clarity.

Should the system detect uniform or non-uniform, broadband noise on all or most channels, the NCU 100 may signal the user via output on a WAU, handset or other associated device, or simply adjust operation to avoid such conflicting signals or noise. Warnings could include a flashing LED, audible tone warning, or other alert that the system had encountered broadband interference. Computers, printers, fax machines and other modern-day office appliances use microprocessors and digital signal processing to perform their tasks. The high-speed logic and high clock speeds used in these accessories lead to the generation of significant amounts of broadband RF noise, often to frequencies of 1 GHz and beyond. The user's manual for systems according to the present invention could inform the user, for instance, that, "If the green LED on the wireless jack is flashing, the unit may be located in an area of high interference. Please move the unit to an AC outlet that is further away from your computer equipment." The time, strength, and duration of the noise interference could be archived for later analysis by online service technicians.

Archiving according to the present invention can also store useful system-maintenance and troubleshooting data. For instance, when a call is terminated, it could examine and store the following parameters:

AGC level or RSS (received signal strength) at call termination

Range parameter

Bit error rates

CRC packet checks

Modulation pattern eye opening

Battery voltage

Information such as the following which relates to call termination or operation of devices can also be monitored, collected and/or reported:

Did the user press the "End" key?

Did the battery run low while the handset was in use?

Was the handset out of normal operating range?

Was the handset in a weak-signal area?

By collecting this type of data, the system can build an effective service archive, a record that can be examined in the event of repeated system malfunction. This archive can be uploaded to the node for examination by a service technician.

The archive can also monitor telephone line status. If a certain line were experiencing noise, hum or periodic outage, the system could record line voltage over a period of time, reporting this information to the node, which could in turn report it to the telephone operating company.

Wireless Access Units

Wireless Access Units 200 according to the present invention may be of two general sorts: (1) analog for a wireless telephone jack function such as one that can accommodate a telephone or a conventional modem; or (2) digital, for a wireless computer or digital device connection (such as DB-25, USB, Ethernet, ISDN-ST, PCMCIA or similar serial or parallel data communications connection).

Figure 5:
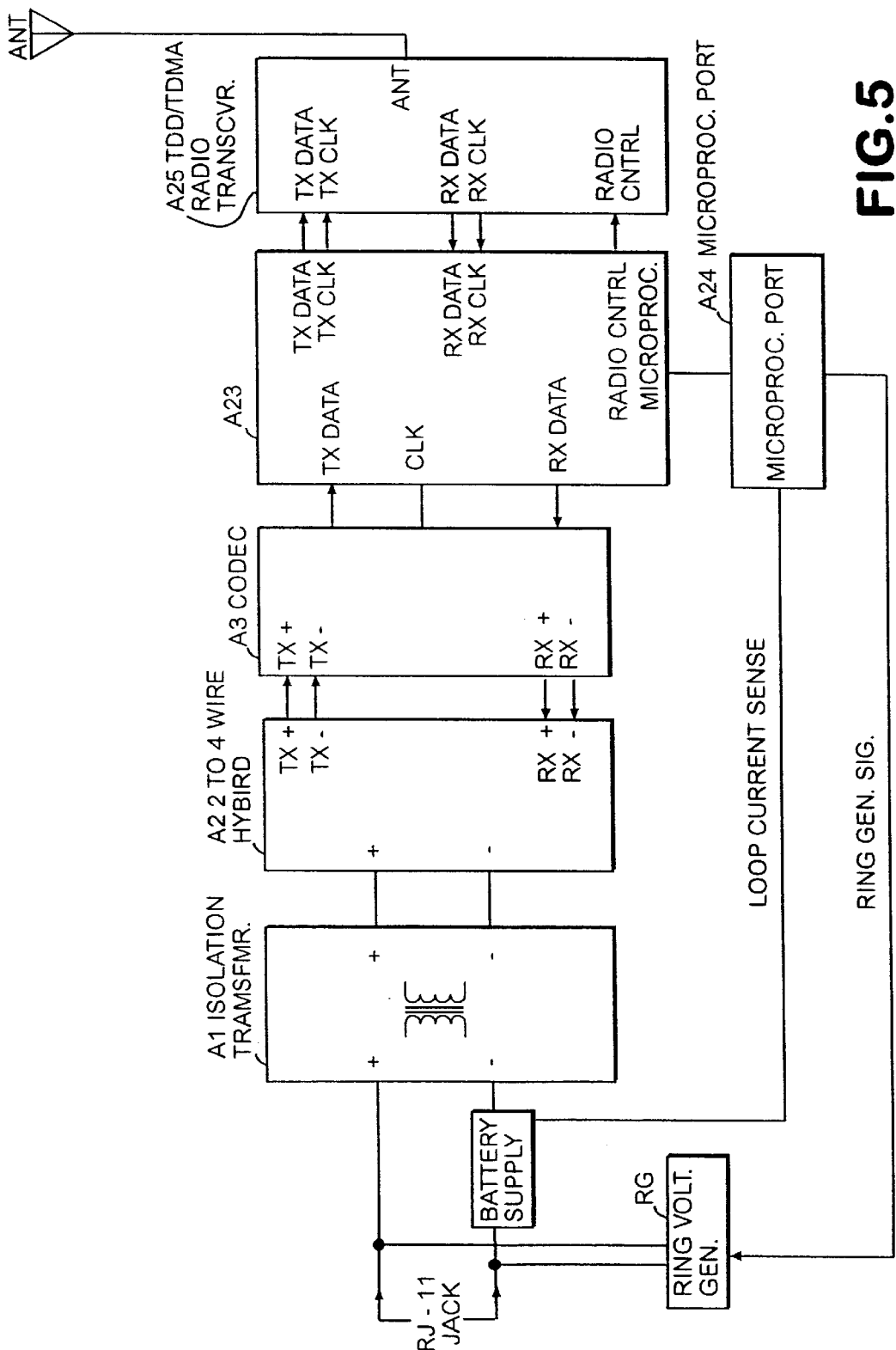
FIG. 5 is a functional block diagram of one embodiment of a Wireless Access Unit according to the present invention.

FIG. 5 shows one form of analog WAU 200 according to the present invention. The analog WAU 200 may include a Radio Transceiver 800 which links WAU 200 via RF connection to NCU 100, a Radio Multiplex Engine 802, a Control Processor 804, and circuitry that provides basic subscriber loop functions of battery, over voltage protection, ringing, supervision (off hook sensing), codec, hybrid and test functionality (so called borscht) functionality. The analog WAU 200 of FIG. 5 may be implemented in a small unit which resembles a wall transformer with one or more RJ-11 jacks on the back or side, and it can, if desired, draw power from any AC outlet and provide an analog telephone type connection to a computer modem, a fax machine, a telephone answering device, a standard telephone or any other device that connects with a standard RJ-11 jack. The unit is transparent to caller ID information, and passes it through. Similarly, the unit passes through coded ringing and other custom signaling. Its power supply provides power for standard telephones which are line powered. Its high voltage ring generator rings telephones with the standard 60 volt rms., 20-Hz ring signal. Note that while this unit is typically though not necessarily "wired" to the AC power wiring and therefore is not totally "wireless," the length between this unit and the incoming lines 640 connected to NCU 100 is wireless. It therefore eliminates the subscriber's need to place telephones where telephone outlets are located. Battery power, if employed, provides even more flexibility in location.

Figure 6:
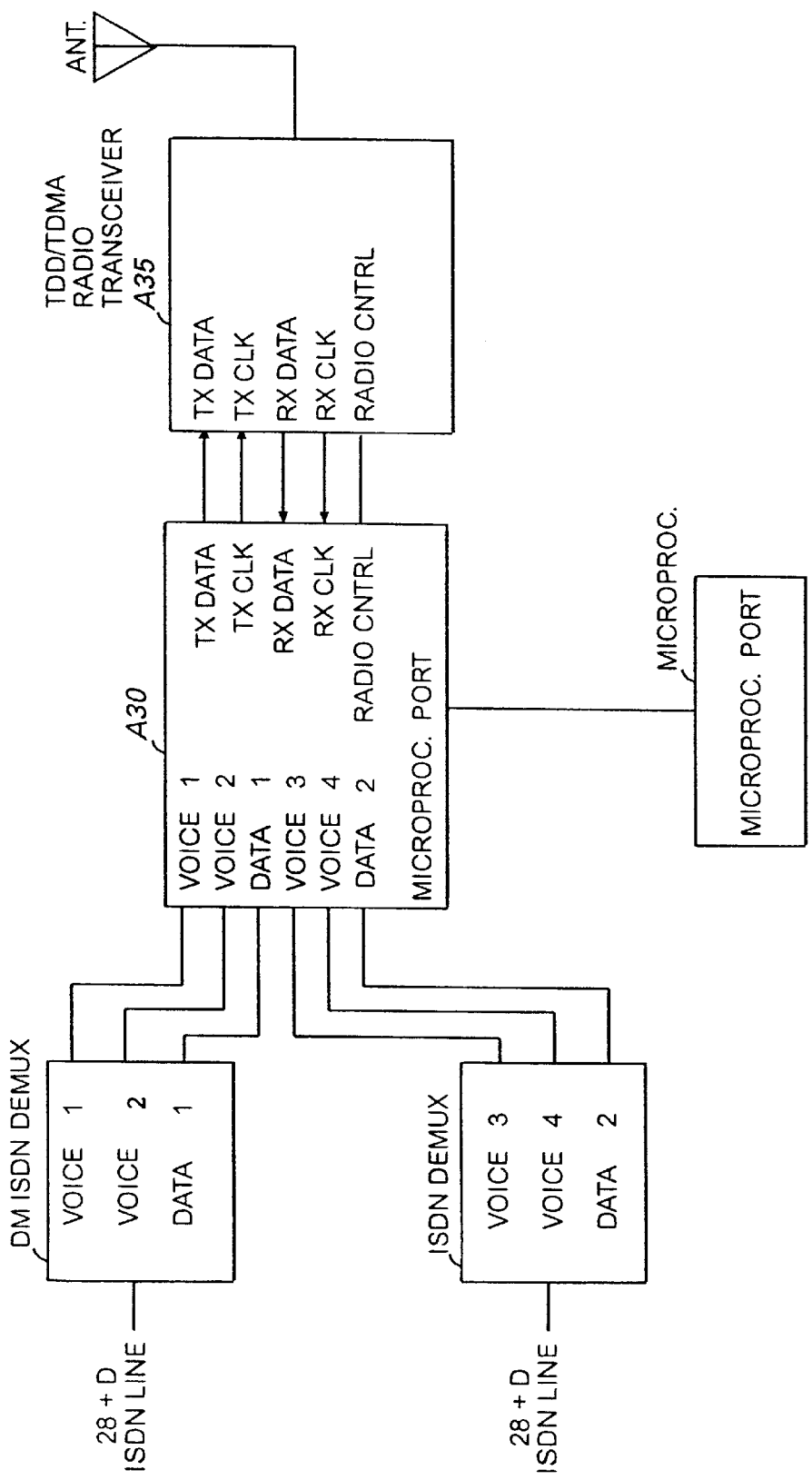
FIG. 6 is a functional block diagram of a Network Control Unit which is adapted to accommodate the ISDN standard, alone or in connection with other analog PSTN connections.
Figure 7:
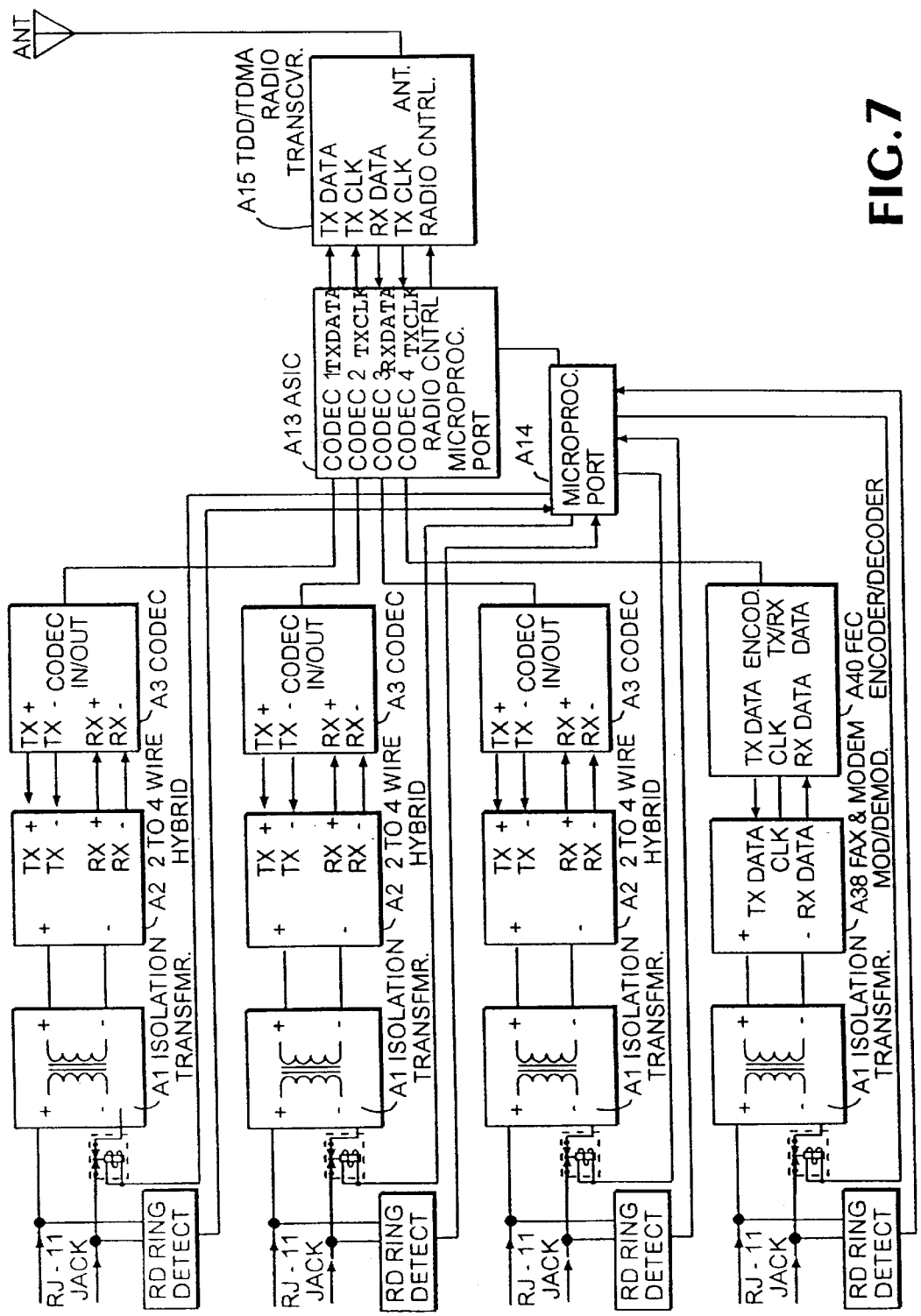
FIG. 7 is a functional block diagram of a Network Control Unit according to the present invention adapted to accommodate three analog and one digital PSTN connections.
Figure 8:
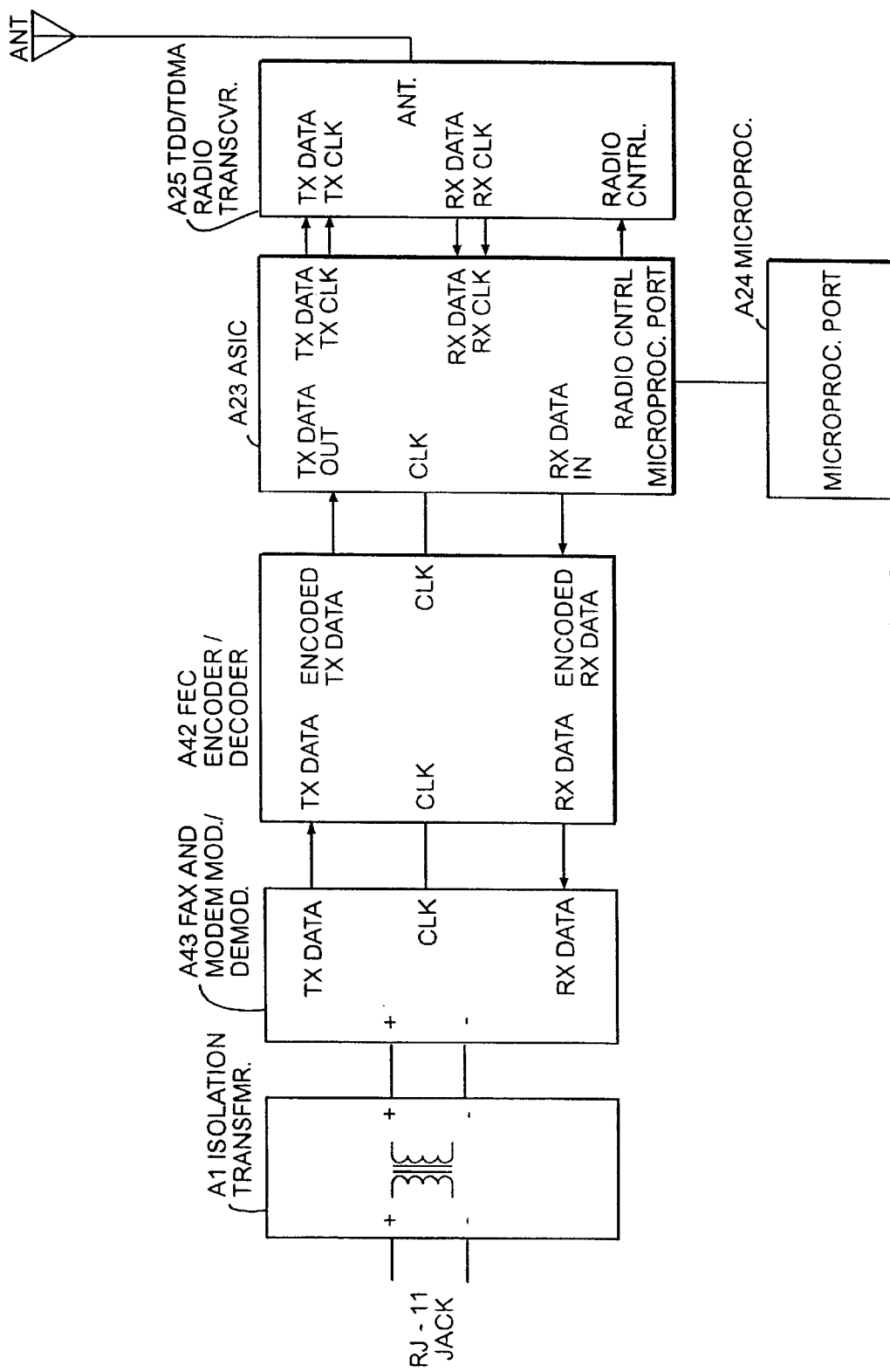
FIG. 8 is a functional block diagram of one embodiment of a digital Wireless Access Unit according to the present invention.
Figure 9A:
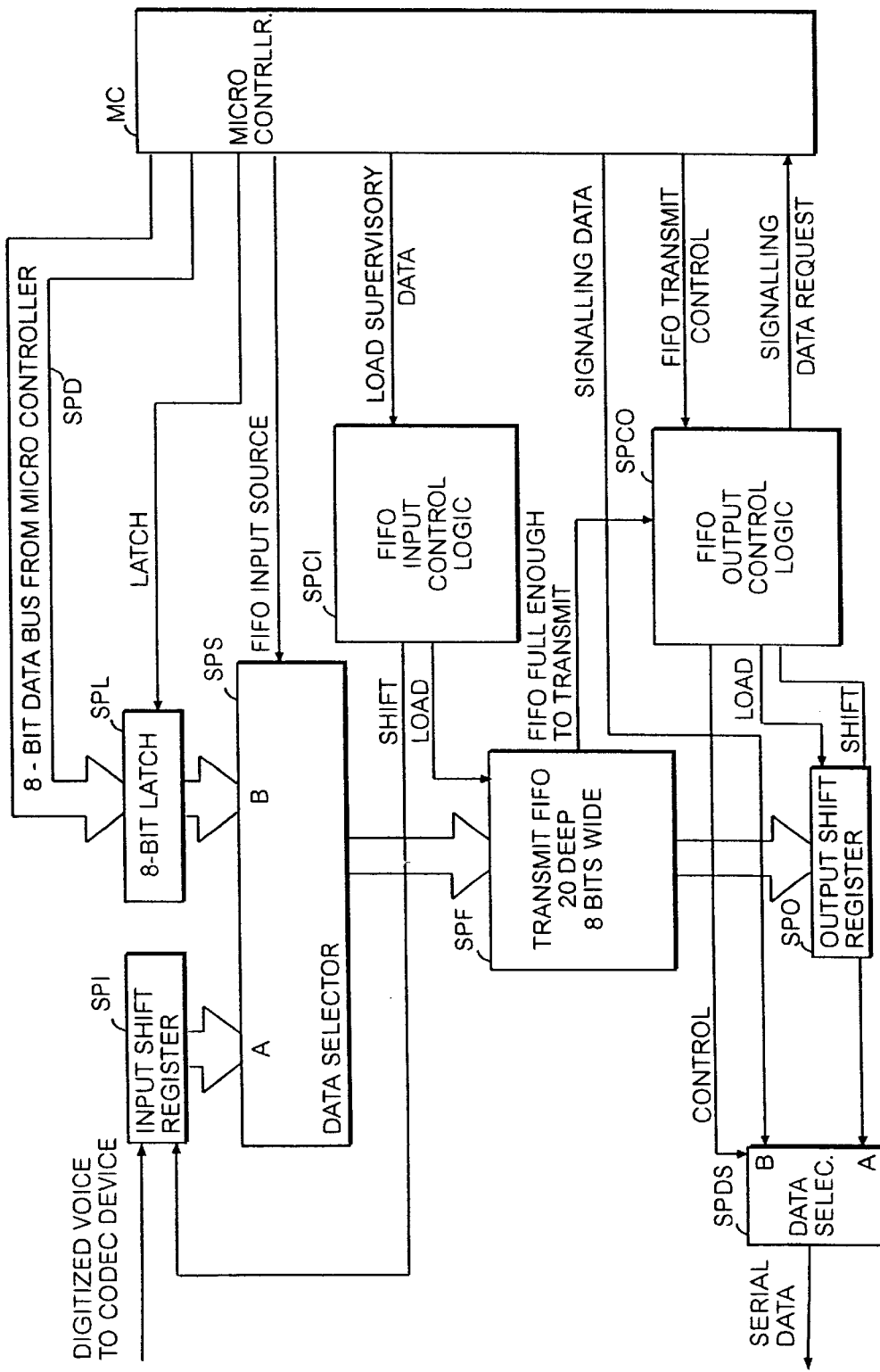
FIGS. 9A and 9B are functional block diagrams as one embodiment of switching/processing circuitry contained in one embodiment of a Wireless Access Unit or handset according to the present invention.
Figure 9B:
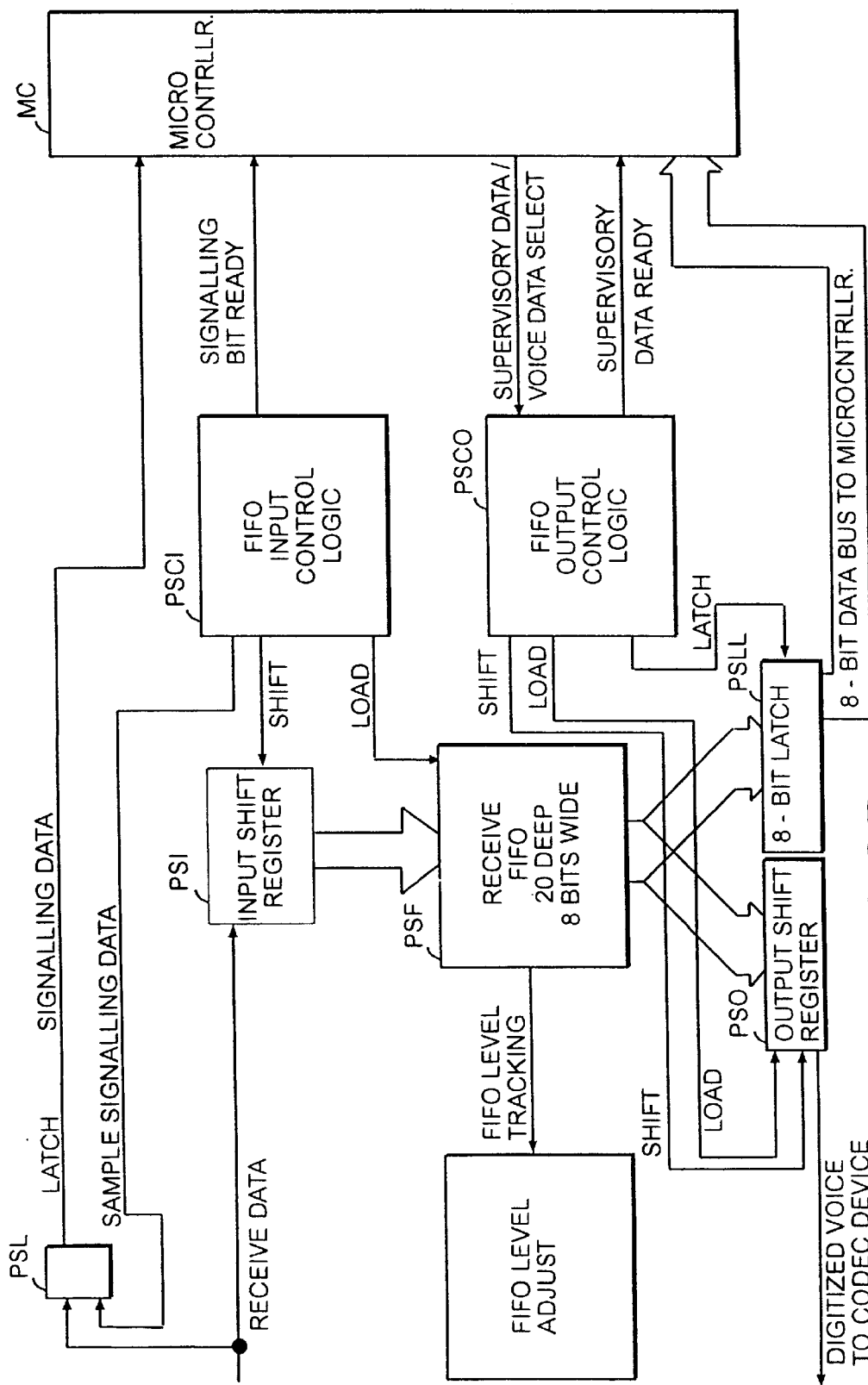
Figure 10:
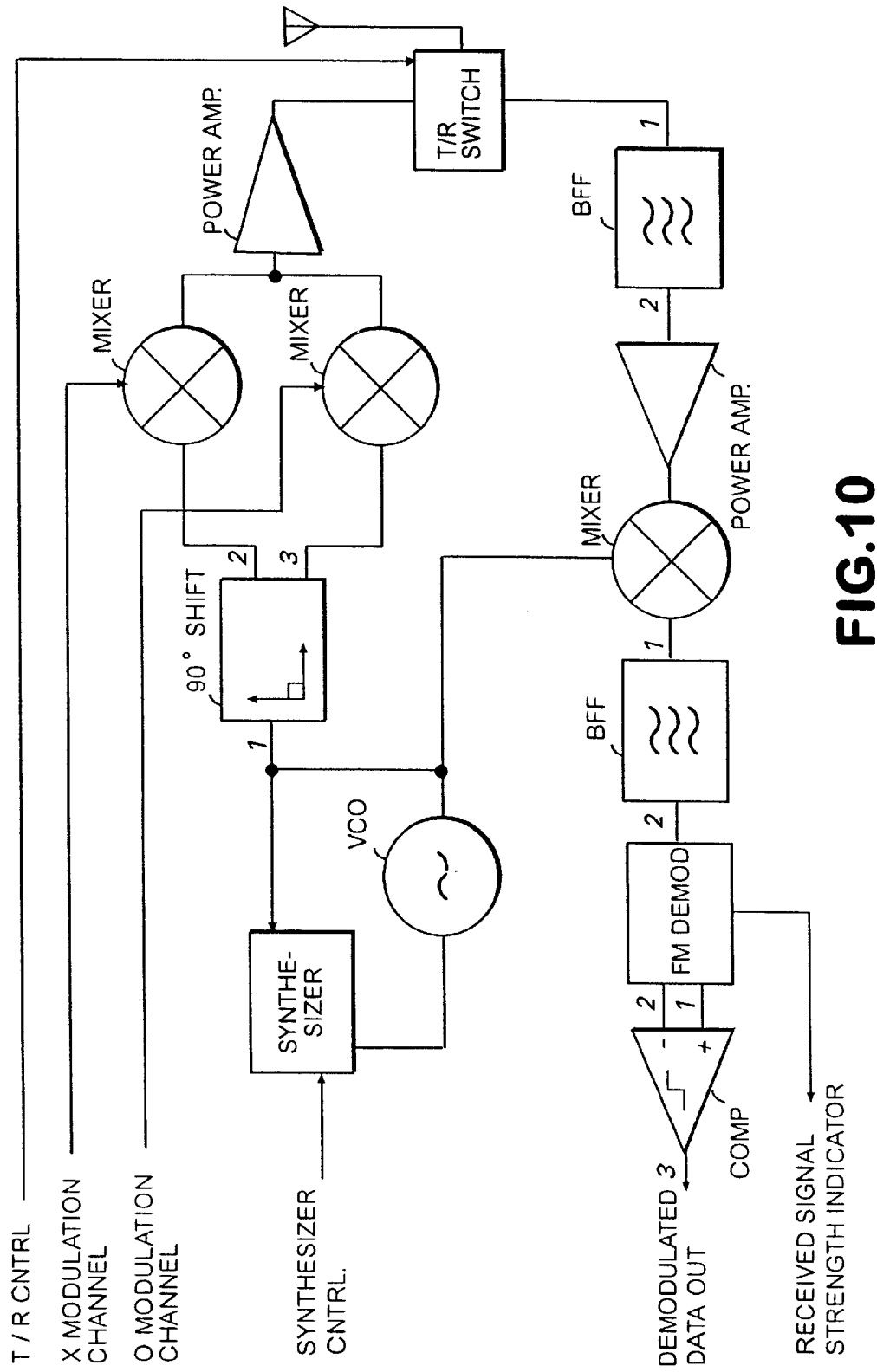
FIG. 10 is a high level functional block diagram of transceiver circuitry which may be employed in the present invention if desired.

A digital Wireless Access Unit 200 of one sort according to the present invention is shown in FIG. 6. Such a Wireless Access Unit 200 can provide wireless connection to computers, computer peripherals, ISDN-ST telephone sets and other digital devices. Since the radio link used in systems according to the present invention is digital, the digital circuitry in the Wireless Access Unit 200 principally performs a buffering, error control, and protocol conversion function. The external digital interface can take many forms, including DB-25, the standard serial port connector; USB, Intel's new universal serial bus standard; parallel-port (printer) connection; Ethernet; 10-base-T; 100-base-T, Fast or Gigabit Ethernet; PCMCIA and others. Digital Wireless Access Unit 200, like analog Wireless Access Unit 200, may be mains or battery powered, so that they may provide untethered convenience to the user.

Wireless Control/Monitoring Accessories

Systems according to the present invention can also perform many control and monitoring functions at a subscriber's location for convenience and increased efficiency. For instance, a wireless doorbell accessory or WAU 200 can emit a coded ring in response to a ringing doorbell signal. The subscriber could then press an "intercom" soft key, placing the subscriber in full duplex communications with the front door visitor and possibly calling up his or her image on a display. Other wireless accessories can provide control over home lighting, garage door opening, and security monitoring. Likewise, via appropriate soft key, the handset or other interface device can control televisions, stereo equipment, heating, air conditioning and appliances. Baby monitoring via wireless audio monitor and other consumer electronics functionality are accommodated by the present system, whether or not via the CE-bus.

Operation

The four main component parts of systems of the present invention, as disclosed above, are the Network Control Unit 100, Wireless Access Units 200, handsets 300 and Wireless Control/Monitoring Accessories 350. While each component may contain an onboard microcontroller which governs its basic functions, the NCU 100 alone or acting in concert with external controller capacity is preferably the principal controller and manager of the entire communications web. All remote components are preferably simple, reliable and preferably of limited intelligence/functionality for reduced costs and increased modularity and so that system performance and functions are principally determined by the NCU 100. The NCU 100 may contain on-line firmware and/or software upgrade capability as discussed above. Through this capacity and the centralized intelligence architecture of the systems according to present invention, functioning of the entire system can be upgraded, new features added, software bugs repaired and hardware bugs patched, all by downloading new firmware into the new NCU 100. The majority of the NCU's computer program code is preferably maintained in flash, reprogrammable memory. Firmware in remote units are preferably implemented in ROM memory, although not necessarily.

The NCU 100 is the central part of the systems' star network topology. for the entire system, the NCU 100 selects RF channels, hop sequences if any, and spreading codes if any; it managers ID strings for the various remotes, and it performs the other functions related to network management, remote unit registration and authentication, and communications protocol management. The NCU 100 also controls the switching and interconnection of the CAB 660, and drives all the Accessory Block features of CAB 660. The following examples describe operation of two embodiments of the communications webs according to the present invention.

EXAMPLE 1

Figure 12A:
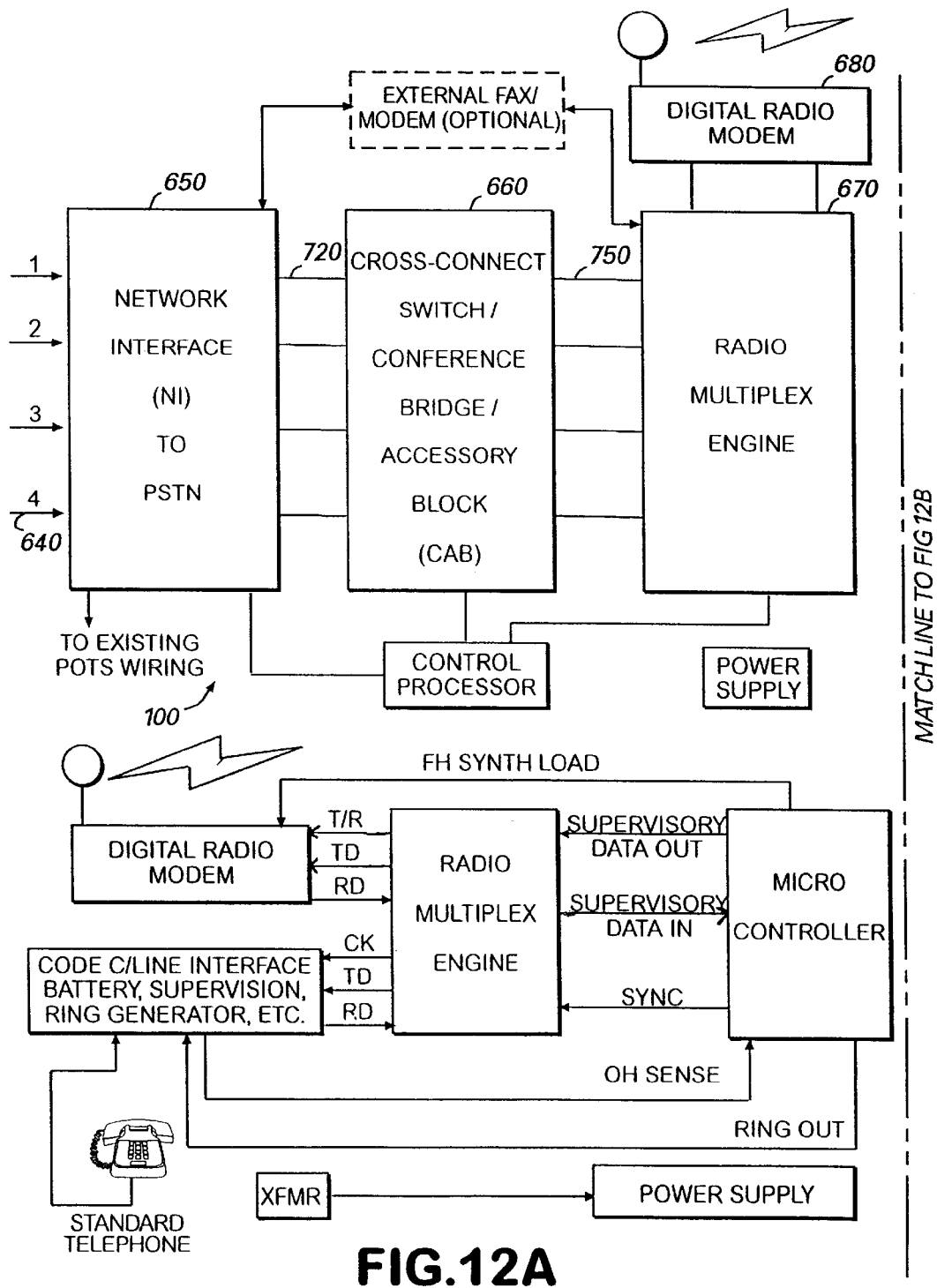
FIG. 12 is a schematic diagram showing operation of a communications web according to the present invention according to Example 1 discussed below.
Figure 12B:
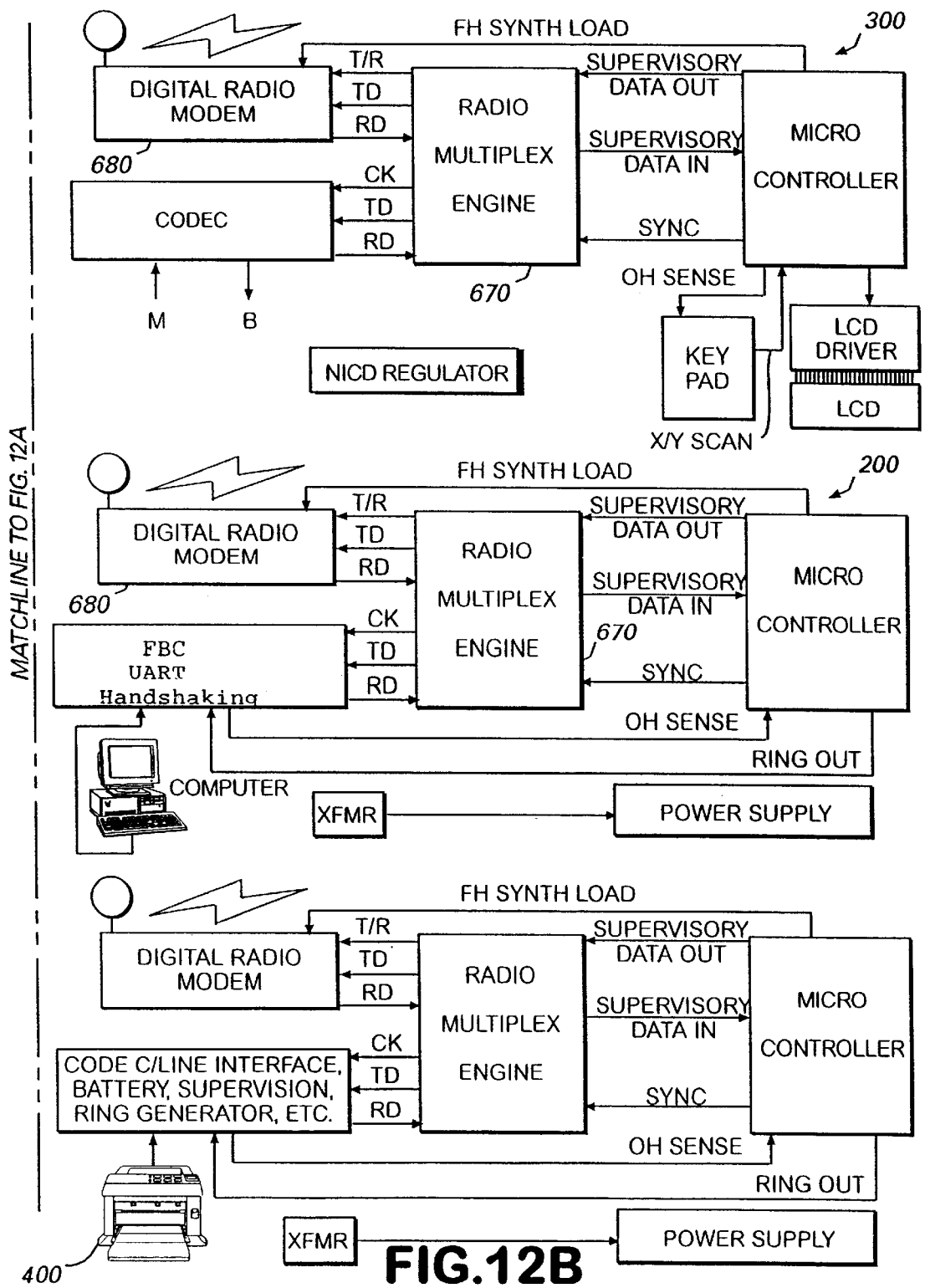

A system according to the present invention is shown in FIG. 12 with four incoming POTS lines, an NCU 100 in the basement or attic, a wireless handset, and three Wireless Access Units 200 which correspond to a telephone, a computer, and a fax machine. The system may be programmed as follows: POTS line 1 is programmed in the CAB 660 to ring through and connect to the LCD handset 300. POTS line 2 rings through and connects to Wireless Access Unit number 1 which is connected to a standard telephone via an RJ-11 jack. POTS line 3 connects to Wireless Access Unit number 2, which is, in turn, adapted to accommodate a fax machine. POTS line 4 connects to Wireless Access Unit number 3 which connects via RS-232 interface to a personal computer.

Signals from POTS lines 1–4 are coupled to Radio Multiplex Engine 670, multiplexed as in TDMA format and modulated onto an RF carrier in RT or digital radio modem 680 for transmission. Handset 300 receives the signal from the NCU 100, and demodulates, demultiplexes and processes the information intended for handset 300. That information is contained in a signal provided to the interfacing circuitry and coder/decoder 650 for delivery to the human interface. The signals are also provided to an LCD driver and screen. In an upstream direction, signals from the keypad and microphone are processed, multiplexed, modulated and forwarded to NCU 100 which ultimately demodulates, demultiplexes and processes the signals for delivery to POTS line 1. Wireless Access Units 1–3 operate generally in a similar manner as far as the RF and multiplexing circuitry are concerned. However, Wireless Access Unit number I contains interface circuitry adapted to accommodate a standard telephone, including, for example, coder/decoder circuitry, line interface, battery, supervision, and ring generator circuitry which interfaces to an RF-11 jack. Wireless Access Unit number 2 interface circuitry intended for a fax machine may be similar or identical to Wireless Access Unit number 1.

Wireless Access Unit number 3 is configured with interface circuitry to accommodate a RS-232 port rather than an RF-11 analog jack. Accordingly, forward error correction, universal asynchronous receiver/transmitter and handshaking circuitry is included in connection with RS-232 serial port standards.

If the subscriber desires to eliminate POTS line 4, for example, or only to subscribe to it for a portion of the day, POTS line 3 could be reprogrammed in the CAB 660 to accommodate Wireless Access Unit number 3 for computer communications while POTS line 2 is configured to ring through to Wireless Access Units 1 and 2 for the telephone and fax machine. Any other combination may be employed as desired, as the user desires new services or different services, or adds devices to the communications web with their attendant Wireless Access Units.

EXAMPLE 2

Figure 13A:
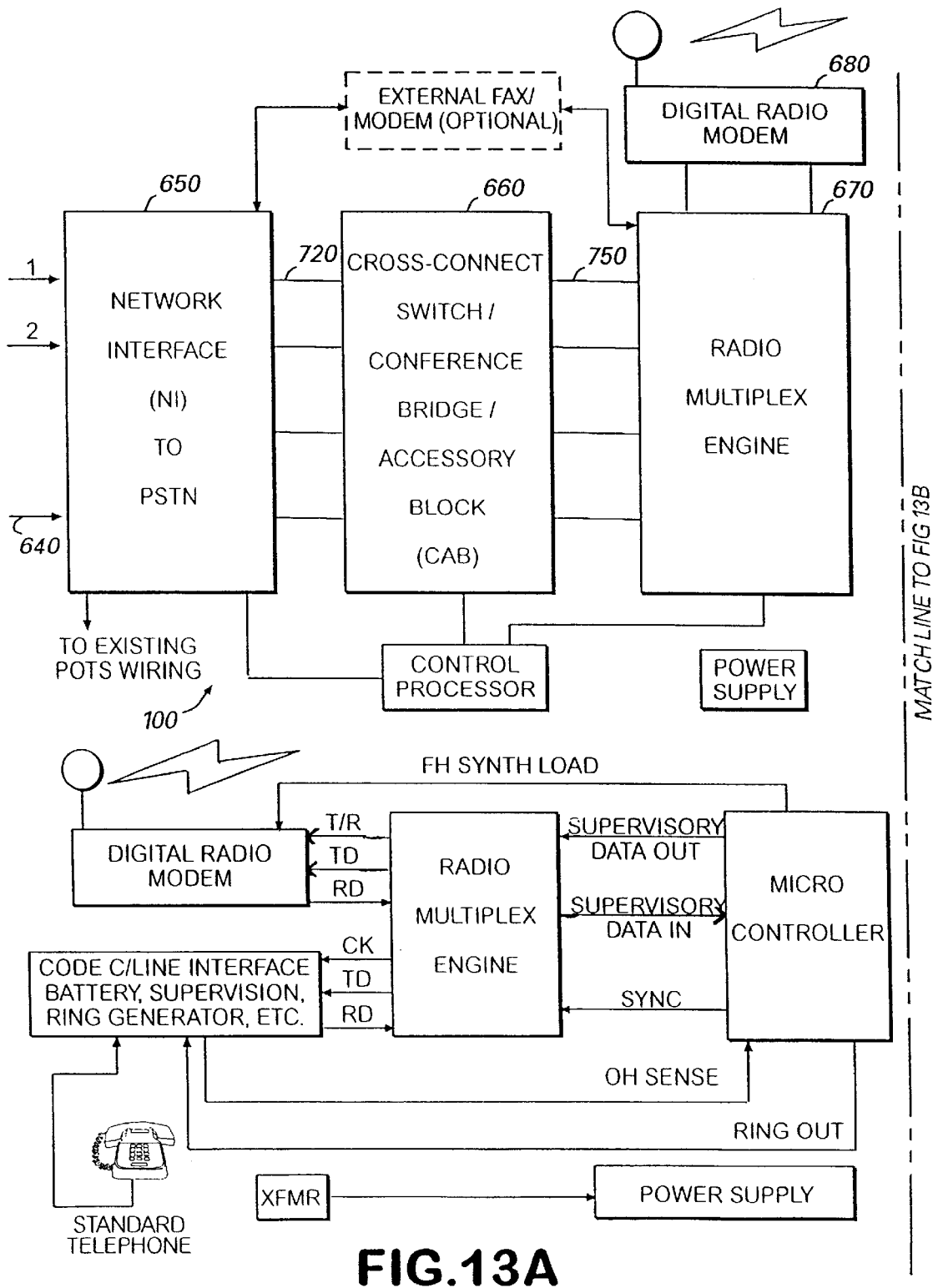
FIG. 13 is a schematic diagram showing operation of another communications web according to the present invention according to Example 2 discussed below.
Figure 13B:
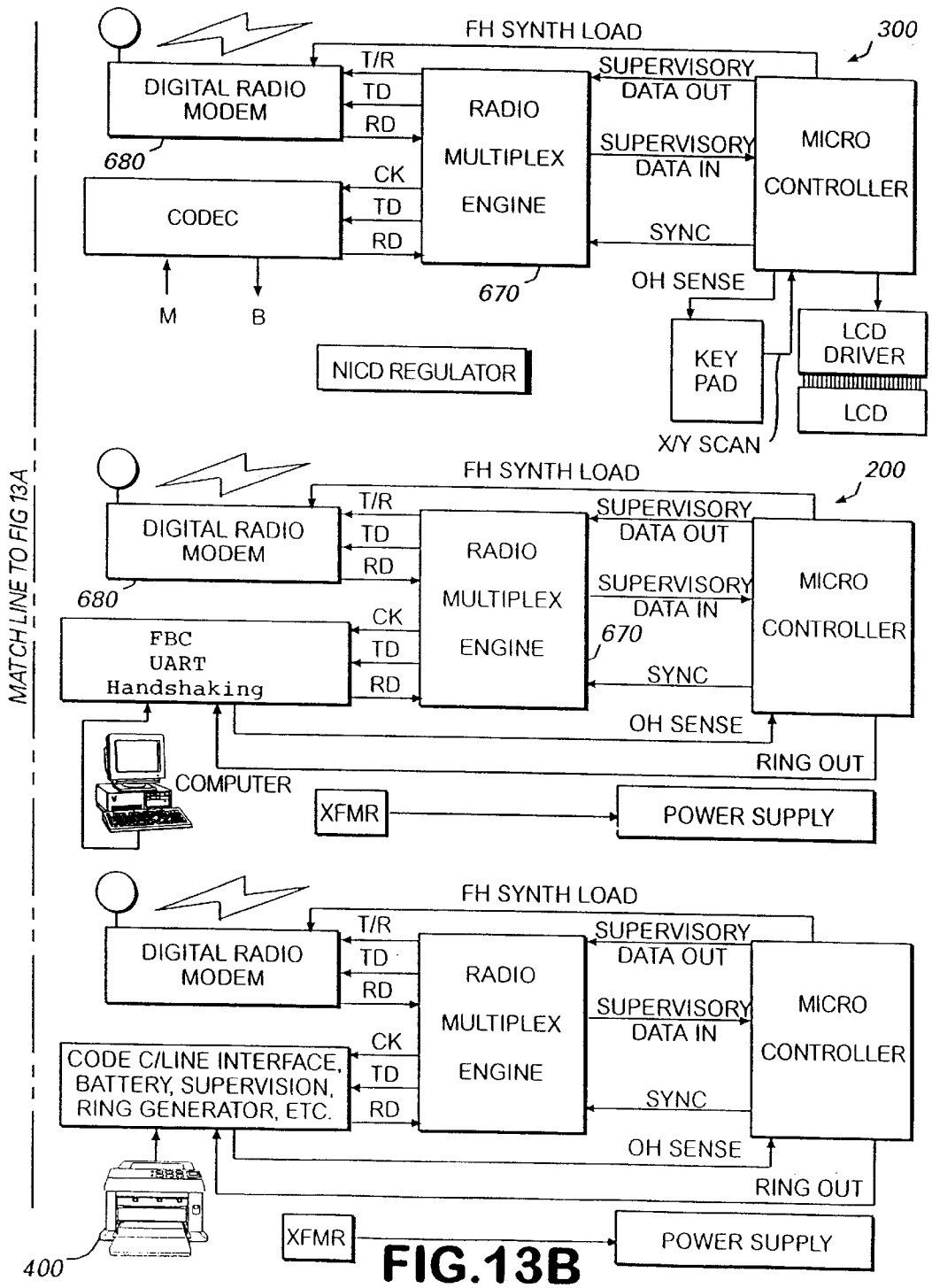

Another system according to the present invention is shown in FIG. 13 with two incoming POTS lines and an ISDN line. POTS line 1 is programmed in CAB 660 of Network Control Unit 100 to ring through and connect to LCD handset 300. POTS line 2 is programmed to ring through and connect to Wireless Access Unit number 1 and number 2, which in turn connect to the standard telephone and a fax machine, respectively. The ISDN line is programmed to connect to Wireless Access Unit number 3 and thus to a computer via a serial port. Again, the lines may be programmed to connect to various handsets 300 and Wireless Access Units 200 as desired as the user desires new or additional services or adds other devices. With the existing devices shown in FIG. 13, for instance, the user could program CAB 660 to connect POTS line 1 to handset 300 and Wireless Access Units 1 and 2 in order to eliminate the second POTS line. Similarly, line 1 could be designated the voice line for connection to handset 300 and Wireless Access Unit number 1. Line 1 or Line 2 could also be wired in the Network Interface 650 or otherwise to connect directly through to existing wiring as shown in FIG. 13.

The foregoing has been provided for purposes of disclosing various embodiments of the present invention. Communications webs according to the present invention and their components and processes may contain various modifications and adaptations, including those which employ new standards and modes of implementation, without departing from the scope or spirit of the present invention.

What is claimed is:

1. Apparatus for allowing a subscriber to communicate via an external telecommunications network with other nodes on the external telecommunications network, comprising:
    a. a base unit comprising:
        first circuitry connected to the external telecommunications network and adapted to render at least one downstream signal from said external network compatible with circuitry in said base unit, and to render at least one upstream signal compatible with the external network; transceiver circuitry adapted to modulate at least one downstream signal onto at least one RF signal and thereby transmit it over at least one RF link, and to receive at least one upstream signal over at least one RF link, demodulate said upstream signal, and couple said upstream signal to other circuits in the base unit; and
        monitoring circuitry further comprising:
            processing circuitry coupled to the receiver circuitry and adapted to control the receiver circuitry and process signals from said receiver circuitry; and
            storage circuitry coupled to said processing circuitry and adapted to store information corresponding to signals in bands of interest received by said receiver;
    b. at least one wireless unit comprising:
        wireless unit transceiver circuitry adapted to receive at least one downstream RF signal from the base unit and demodulate said downstream RF signal, and to modulate at least one upstream signal from other circuitry in said wireless unit onto at least one RF signal in order to transmit the upstream signal to the base unit; and
        interface circuitry coupled to said wireless unit transceiver circuitry adapted to render downstream signals suitable for imparting information usable to the subscriber, and upstream signals compatible with the wireless unit transceiver circuitry.

2. Apparatus according to claim 1 in which the apparatus includes only one wireless unit.

3. Apparatus according to claim 1 in which the apparatus includes more than one wireless unit.

4. Apparatus according to claim 1 in which the apparatus includes;
    in the base unit, second circuitry coupled to said first circuitry and to said transceiver circuitry, the second circuitry adapted to multiplex at least two signals from the first circuitry into a downstream signal, and to demultiplex at least one upstream signal from the transceiver circuitry, and
    in at least one wireless unit, demultiplexing circuitry adapted to demultiplex at least one downstream signal.

5. Apparatus according to claim 1 in which the base unit is adapted to send to another node in said telecommunications network at least some of said information corresponding to signals in said bands of interest received by said receiver.

6. Apparatus according to claim 1 in which said receiver is adapted to scan bands of interest in order to receive information corresponding to signals in said bands of interest.

7. Apparatus according to claim 1 in which said base unit is adapted to identify at least one signal in said bands of interest.

8. Apparatus according to claim 1 in which said base unit is adapted to change its operation based on information corresponding to signals in said bands of interest.

9. Apparatus according to claim 1 in which said base unit is adapted to alter frequencies on which it operates based on information corresponding to signals in said bands of interest.

10. Apparatus according to claim 1 in which said base unit is adapted to alter timing of operation based on information corresponding to signals in said bands of interest.

11. Apparatus according to claim 1 in which said base unit is adapted to collect and report upstream anomalies in operation of said wireless unit.

12. Apparatus according to claim 1 in which said base unit is adapted to collect and report upstream times of operation and non-operation of said wireless unit.

13. Apparatus according to claim 1 in which said base unit is adapted to collect and report upstream signal strength from said wireless unit.

14. Apparatus according to claim 1 in which said base unit is adapted to collect information relating to other base units in the vicinity of said base unit, and other wireless units being used in conjunction with said other base units.

15. Apparatus for allowing a subscriber to communicate via an external telecommunications network with other nodes on the external telecommunications network, comprising:
    a. a base unit comprising:
        first circuitry connected to the external telecommunications network and adapted to render at least one downstream signal from said external network compatible with circuitry in said base unit, and to render at least one upstream signal compatible with the external network;
        second circuitry coupled to said first circuitry and to transceiver circuitry, the second circuitry adapted to multiplex at least two signals from the first circuitry into a downstream signal, and to demultiplex at least one upstream signal from the transceiver circuitry;
        said transceiver circuitry adapted to modulate at least one downstream signal onto at least one RF signal and thereby transmit it over at least one RF link, and to receive at least one upstream signal over at least one RF link, demodulate said upstream signal, and couple said upstream signal to other circuits in the base unit; and
        monitoring circuitry further comprising:
            processing circuitry coupled to the receiver circuitry and adapted to control said receiver circuitry and process signals from said receiver circuitry; and
            storage circuitry coupled to said processing circuitry and adapted to store information corresponding to signals in bands of interest received by said receiver;
    b. at least one wireless unit comprising:
        wireless unit transceiver circuitry adapted to receive at least one downstream RF signal from the base unit and demodulate said downstream RF signal, and to modulate at least one upstream signal from other circuitry in said wireless unit onto at least one RF signal in order to transmit the upstream signal to the base unit;
        demultiplexing circuitry for demultiplexing downstream signals; and interface circuitry coupled to said wireless unit transceiver circuitry adapted to render downstream signals suitable for imparting information usable to the subscriber, and upstream signals compatible with the wireless unit transceiver circuitry.

16. Apparatus according to claim 15 in which the base unit is adapted to send to another node in said telecommunications network at least some of said information corresponding to signals in said bands of interest received by said receiver.

17. Apparatus according to claim 15 in which said receiver is adapted to scan said bands of interest in order to receive information corresponding to signals in said bands of interest.

18. Apparatus according to claim 15 in which said base unit is adapted to identify at least one signal in said bands of interest.

19. Apparatus according to claim 15 in which said base unit is adapted to change its operation based on information corresponding to signals in said bands of interest.

20. Apparatus according to claim 15 in which said base unit is adapted to alter frequencies on which it operates based on information corresponding to signals in said bands of interest.

21. Apparatus according to claim 15 in which said base unit is adapted to alter timing of operation based on information corresponding to signals in said bands of interest.

22. Apparatus according to claim 15 in which said base unit is adapted to collect and report upstream anomalies in operation of said wireless unit.

23. Apparatus according to claim 15 in which said base unit is adapted to collect and report upstream times of operation and non-operation of said wireless unit.

24. Apparatus according to claim 15 in which said base unit is adapted to collect and report upstream signal strength from said wireless unit.

25. Apparatus according to claim 15 in which said base unit is adapted to collect information relating to other base units in the vicinity of said base unit, and other wireless units being used in conjunction with said other base units.

26. A system for communicating over a telecommunications network, comprising:
   a. a plurality of base units, each comprising:
      first circuitry connected to the telecommunications network and adapted to render at least one downstream signal from said network compatible with circuitry in said base units, and to render at least one upstream signal compatible with said network;
      transceiver circuitry adapted to modulate at least one downstream signal onto at least one RF signal and thereby transmit it over at least one RF link, and to receive at least one upstream signal over at least one RF link, demodulate said upstream signal, and couple said upstream signal to other circuits in the base units; and
      monitoring circuitry further comprising:
         processing circuitry coupled to the receiver circuitry and adapted to control said receiver and process signals from said receiver circuitry;
         storage circuitry coupled to said processing circuitry and adapted to store information corresponding to signals in bands of interest received by said receiver;
   b. a plurality of wireless units, each associated with one of said base units, each of said wireless units comprising:
      wireless unit transceiver circuitry adapted to receive at least one downstream RF signal from said base units and demodulate said downstream RF signal, and to modulate at least one upstream signal from other circuitry in said wireless units onto at least one RF signal in order to transmit the upstream signal to said base units;
      interface circuitry coupled to said wireless units transceiver circuitry adapted to render downstream signals suitable for imparting information usable to subscriber, and upstream signals compatible with the wireless unit transceiver circuitry; and
   c. at least one system management node adapted to receive signals over said telecommunications network from at least some of said base units and to collect information from said base units corresponding to bands of interest monitored by said base units.

27. The system according to claim 26 in which at least some of the base units are associated with only one wireless unit.

28. The system according to claim 26 in which at least some of the base units are associated with more than one wireless unit.

29. The system according to claim 26 in which at least some of said base units include second circuitry coupled to said first circuitry and to said transceiver circuitry, the second circuitry adapted to multiplex at least two signals from the first circuitry into a downstream signal, and to demultiplex at least one upstream signal from the transceiver circuitry, and the wireless units associated with said base units include demultiplexing circuitry for demultiplexing at least one downstream signal.

30. The system according to claim 26 in which at least some of said base units are adapted to send to the system management node at least some of said information corresponding to signals in said bands of interest received by the receiver in said system management node.

31. The system according to claim 26 in which the receiver in at least some of said wireless units are adapted to scan said bands of interest in order to receive information corresponding to signals in said bands of interest.

32. The system according to claim 26 in which at least some of said base units are adapted to identify at least one signal in said bands of interest.

33. The system according to claim 26 in which at least some of said base units are adapted to change their operation based on information corresponding to signals in said bands of interest.

34. The system according to claim 26 in which at least some of said base units are adapted to alter frequencies on which they operate based on information corresponding to signals in said bands of interest.

35. The system according to claim 26 in which at least some of said base units are adapted to alter timing of operation based on information corresponding to signals in said bands of interest.

36. The system according to claim 26 in which at least some of said base units are adapted to collect and report to said system management node anomalies in operation of at least some wireless units.

37. The system according to claim 26 in which at least some of said base units are adapted to collect and report to said system management node times of operation and non-operation of at least some wireless units.

38. The system according to claim 26 in which at least some of said base units are adapted to collect and report upstream signal strength from at least some wireless units.

39. The system according to claim 26 in which at least some of said base units are adapted to collect information relating to other base units in the vicinity of said base units, and other wireless units being used in conjunction with said other base units.

* * * * *